US012567220B2

(12) United States Patent
Fieldman

(10) Patent No.: US 12,567,220 B2
(45) Date of Patent: Mar. 3, 2026

(54) SYSTEMS AND METHODS FOR USING ADVERBS FOR IMPROVED CREATION OF EXTENDED REALITY WORLDS, EXPERIENCES, SIMULATIONS AND LEARNING ACTIVITIES

(71) Applicant: CURIOXR, INC., Gainesville, FL (US)

(72) Inventor: Ethan Fieldman, Gainesville, FL (US)

(73) Assignee: CURIOXR, INC., Gainesville, FL (US)

( * ) Notice: Subject to any disclaimer, the term of this patent is extended or adjusted under 35 U.S.C. 154(b) by 0 days.

(21) Appl. No.: 19/213,393

(22) Filed: May 20, 2025

(65) Prior Publication Data

US 2025/0278909 A1 Sep. 4, 2025

Related U.S. Application Data

(63) Continuation of application No. 18/406,741, filed on Jan. 8, 2024, now Pat. No. 12,333,663, which is a continuation of application No. 18/306,800, filed on Apr. 25, 2023, now Pat. No. 11,900,555.

(51) Int. Cl.
| | |
|---|---|
| *G06T 19/00* | (2011.01) |
| *G06F 3/01* | (2006.01) |
| *G06T 19/20* | (2011.01) |

(52) U.S. Cl.
CPC ............ *G06T 19/006* (2013.01); *G06F 3/017* (2013.01); *G06T 19/20* (2013.01)

(58) Field of Classification Search
None
See application file for complete search history.

(56) References Cited

U.S. PATENT DOCUMENTS

| | | | |
|---|---|---|---|
| 10,748,302 B1 * | 8/2020 | Dine | G06T 19/00 |
| 2011/0036452 A1 | 2/2011 | Schnyder et al. | |
| 2012/0249741 A1 * | 10/2012 | Maciocci | G06T 19/006 |
| | | | 348/51 |
| 2013/0307875 A1 | 11/2013 | Anderson | |
| 2015/0277555 A1 * | 10/2015 | Morishita | G06F 3/012 |
| | | | 345/156 |
| 2016/0026242 A1 | 1/2016 | Burns et al. | |
| 2016/0203640 A1 | 7/2016 | Breedvelt-Schoulten et al. | |
| 2016/0286163 A1 | 9/2016 | Edwards | |
| 2017/0052595 A1 | 2/2017 | Poulos et al. | |
| 2017/0135519 A1 | 5/2017 | Deng et al. | |
| 2018/0143693 A1 | 5/2018 | Calabrese et al. | |
| 2018/0300952 A1 | 10/2018 | Evans et al. | |
| 2019/0391726 A1 * | 12/2019 | Iskandar | G06F 3/04842 |
| 2020/0018971 A1 * | 1/2020 | Evertt | G02B 27/0093 |
| 2020/0371673 A1 * | 11/2020 | Faulkner | G06F 3/017 |

(Continued)

OTHER PUBLICATIONS

Meta AI, "Builder Bot Demo," Feb. 23, 2022, https://www.youtube.com/watch?v=62RJv514ijQ, accessed May 10, 2023.

(Continued)

*Primary Examiner* — Frank S Chen
(74) *Attorney, Agent, or Firm* — Polsinelli PC

(57) ABSTRACT

A user with an extended reality hardware device creates and changes appearance of a digital object in extended reality environments by using voice commands including adverbs in conjunction with pointing action of a hand at location point. A representation of the digital object is retrieved for display at the location point pointed to by the user.

18 Claims, 17 Drawing Sheets

(56)                    References Cited

U.S. PATENT DOCUMENTS

| | | |
|---|---|---|
| 2022/0202493 A1 | 6/2022 | Gibby et al. |
| 2022/0366659 A1 | 11/2022 | Blakeley et al. |
| 2023/0410436 A1 | 12/2023 | Beauchamp et al. |

OTHER PUBLICATIONS

Malik, Aisha, "Mark Zuckerberg demos a tool for building virtual worlds using voice commands," Feb. 23, 2022, https://techcrunch.com/2022/02/23/mark-zuckerberg-demos-a-tool-for-building-virtual-worlds-using-voice-commands/, accessed May 10, 2023.
"DALL E 2," https://openai.com/product/dall-e-2, accessed May 10, 2023.
G2.com, Inc., "Dall E 2 Alternatives," https://www.g2.com/search?utf8=%E2%9C%98&query=Dall-E, accessed May 10, 2023.
G2.com, Inc., "Best Synthetic Media Software," https://www.g2.com/categories/synthetic-media, accessed May 10, 2023.

* cited by examiner

300

310

Dashed lines indicates user's field of view

910

300

Water molecule spawns where user indicated in command

20

'I want a water molecule here'

300

User's POV with hand indicating where to spawn object

1500

1510

SYSTEMS AND METHODS FOR USING ADVERBS FOR IMPROVED CREATION OF EXTENDED REALITY WORLDS, EXPERIENCES, SIMULATIONS AND LEARNING ACTIVITIES

CROSS-REFERENCE TO RELATED APPLICATIONS

This application is a continuation of U.S. Non-Provisional application Ser. No. 18/406,741, filed Jan. 8, 2024, titled "SYSTEMS AND METHODS FOR USING ARTIFICIAL INTELLIGENCE FOR IMPROVED CREATION OF EXTENDED REALITY WORLDS, EXPERIENCES, SIMULATIONS AND LEARNING ACTIVITIES," which is a continuation of U.S. Non-Provisional application Ser. No. 18/306,800, filed Apr. 25, 2023, now U.S. Pat. No. 11,900,555, titled "SYSTEMS AND METHODS FOR USING ARTIFICIAL INTELLIGENCE FOR IMPROVED CREATION OF EXTENDED REALITY WORLDS, EXPERIENCES, SIMULATIONS AND LEARNING ACTIVITIES," which are incorporated herein by reference in their entirety.

BACKGROUND OF THE INVENTION

Extended reality (XR) environments, i.e., environments created by immersive technologies that merge physical and virtual worlds, such as augmented reality (AR), virtual reality (VR), and mixed reality (MR) and the like, have grown more realistic and immersive as VR headsets, augmented reality devices and applications, processor speeds, data storage and data transfer technologies have continued to improve. However, unlike conventional physical reality, electronic XR environments present more opportunities for persons to collaborate and share information, including in work and education fields, in ways that are not possible in the physical constraints of the real-world.

SUMMARY OF THE INVENTION

Embodiments of the invention provided an improved method and system for users in XR environments, including VR environments such as in the Oculus/Meta Quest platform by Oculus VR (Irvine, CA) (parent company Meta), to build, create and place digital objects and manipulate the same and surrounding through a combination of voice commands and pointing. Preferably pointing is with the user's hand, including a finger, but could also be accomplished using controllers or virtual tools that allow the user to specify a location in the XR environment where a created or moved object should be placed. It will be appreciated that the systems and methods, including related displays, user interfaces, controls and functionalities, disclosed herein may be similarly implemented on other XR platforms with other XR SDKs and software development tools known to XR developers.

In one method a digital object is generated in an extended reality environment by detecting a voice command from a user using an extended reality environment via an extended reality hardware device that requests creation of a digital object for display in the extended reality environment, detecting a pointing action from the user at a location point in the extended reality environment via the extended reality hardware device, and displaying the digital object at the location point in the extended reality environment via the extended reality hardware device in response to both the detecting of the voice command and the pointing action from the user.

In embodiments, the extended reality environment for the foregoing method is an augmented reality environment, virtual reality environment or a mixed reality environment.

In embodiments, the foregoing method for generating an object in an XR environment includes retrieving a representation of the digital object with an artificial intelligence process that provides the representation for displaying the digital object at the location point. In an embodiment, the location point is a vector with coordinates in the virtual reality environment. In a further embodiment, the coordinates of the vector are determined by an intersection point of a ray cast from the pointing action of the user with an existing virtual object or virtual boundary in the virtual reality environment.

In embodiments, the ray cast from the pointing action of the user intersects an extended reality boundary of an extended reality representation of a floor or wall. In various embodiments, the digital object is displayed on or interacting with the existing extended reality object.

In embodiments, the aforementioned methods of generating a digital object in an XR environment includes receiving spoken instructions from the user via the extended reality hardware device that the digital object should include one or more visual attributes, and displaying the digital object via the extended reality hardware device in the extended reality environment as including the one or more visual attributes. One or more visual attributes can include: type, color, size, volume, height, width, length, movement, speed, texture, location of components of the digital object and combinations thereof.

In some embodiments of the aforementioned methods, a size gesture is detected from one or more hands of the user via the extended reality hardware device indicating that the digital object should be represented according to the size gesture; and the digital object is displayed via the extended reality hardware device in the extended reality environment as including a size in accordance with the size gesture. The size gesture can be received from detection of both hands of the user via the extended reality hardware device.

Another embodiment of the aforementioned methods, includes receiving spoken instructions from the user or a pointing gesture detected from or one both hands of the user via the extended reality hardware device that the digital object should include a visual attribute with a measurable dimension, displaying a measurement selection interface with measurement markings in the extended reality environment via the extended reality hardware device, receiving a selection of a specific dimension for the visual attribute from a user interacting with the interface in the extended reality environment via the extended reality hardware device, and displaying the digital object via the extended reality hardware device in the extended reality environment with the visual attribute representing the specific dimension. In embodiments, the measurable dimension is one of size, volume, height, width, and length. In a certain embodiment, the measurable dimension is volume, and the visual attribute includes liquid represented within the digital object as having the volume selected by the user via the measurement selection interface.

DETAILED DESCRIPTION

Figure 1:
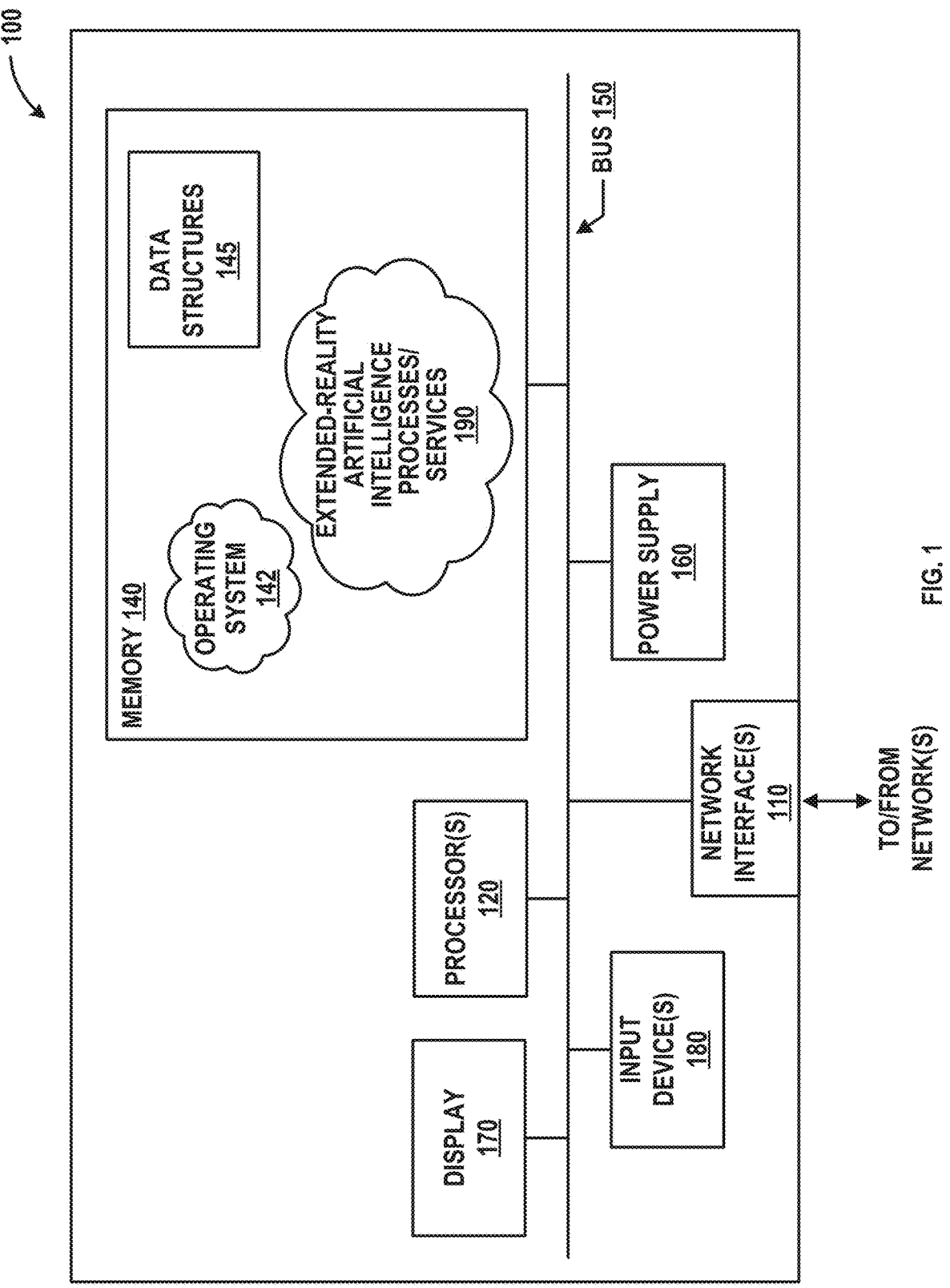
FIG. 1 is a schematic block diagram of an extended reality device in one embodiment of the invention.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Electronic XR environments also enable users to create and build their environments by changing surroundings, adding digital objects, moving digital objects, removing digital objects, manipulating digital objects, and like creative activities in an extended reality world. While a "digital object" is described in examples herein as generally 3-dimensional graphical representations of physical real world objects that are displayed in an extended reality environment, a "digital object" can include many different types of digital assets such images, graphical representations, videos, text, audio, documents, files, links or hyperlinks to electronic information, links or views to other virtual locations on the extended reality platform (e.g. doorway to another virtual room to which a user could transport), multimedia, animations, icons or tags that represent one or more of the forgoing and similar electronic objects.

In electronic VR environments, such as implemented through development tools for the Oculus/Meta Quest platform (Oculus Platform SDK) by Oculus VR (Irvine, CA) (parent company Meta) there are both challenges and opportunities for customizing how users create in the XR environment. Typically, creative activities had to rely on software development and platform programming so that environments and objects are designed and built with software development tools rather than by a user within in an XR environment itself.

In February 2022, Meta introduced a "Builder Bot" creation tool for its MetaQuest platform where users could build and manipulate digital objects and scenery within a VR environment using voice commands and artificial intelligence. See *Builder Bot demonstration* at https://www.youtube.com/watch?v=62RJv514ijQ (incorporated herein by reference). See also "Mark Zuckerberg demos a tool for building virtual worlds using voice commands" https://techcrunch.com/2022/02/23/mark-zuckerberg-demos-a-tool-for-building-virtual-worlds-using-voice-commands/ (incorporated herein by reference).

However, the "Builder Bot" tool is limited in that users seeking to build an environment in extended reality do not have the ability to place or manipulate objects, such as by pointing or voice-specifying a relative location as to where a digital object should appear relative to the user and/or other objects.

In various embodiments, methods and systems of the invention are preferably implemented through development tools for the Oculus/Meta Quest platform (Oculus Platform SDK) by Oculus VR (Irvine, Calif.) (parent company Meta). It will be appreciated that the systems and methods, including related displays, user interfaces, controls and functionalities, disclosed herein may be similarly implemented on other VR or extended reality (XR) platforms with other VR SDKs and software development tools known to VR developers.

Corresponding reference characters indicate corresponding elements among the view of the drawings. The headings used in the figures do not limit the scope of the claims.

| ELEMENTS LIST | |
|---|---|
| Element Number | Description |
| 10 | extended reality environment |
| 20 | user verbal request for creation of digital object |
| 100 | extended reality (XR) device |
| 110 | network interface(s) |
| 120 | processor(s) |
| 140 | memory |
| 142 | operating system |
| 145 | data structures |
| 150 | bus |
| 160 | power supply |
| 170 | display |
| 180 | input device(s) |
| 190 | XR artificial intelligence processes/services |
| 200 | user |
| 210 | step - user voice command |
| 212 | step - determine if digital object attributes |
| 214 | step - receive specific attributes request |
| 216 | step - default attributes if no specified attributes |
| 218 | step- provide options for attributes |
| 220 | step - receive VP point vector3 coordinates |
| 230 | step - assess if VP has a value |
| 250 | step - spawn requested object in front of user if null VP value |
| 255 | step - if VP value associate object being pointed at and determine if location specified |
| 260 | step - spawn requested item on object closest to user |
| 270 | step - spawn object in specified location |
| 280 | liquid attributes |
| 284 | water attributes and values |
| 286 | hydrochloric acid attributes and values |
| 300 | virtual hand |

-continued

ELEMENTS LIST

| Element Number | Description |
| --- | --- |
| 310 | raycast |
| 350 | specified location point (A) |
| 360 | created/spawned object (table) |
| 400 | first object (table) |
| 410 | second object (duplicated table) |
| 420 | specified location point (B) |
| 500 | linked object (beaker) |
| 600 | filling of linked object (liquid) |
| 710 | measurement selection |
| 720 | measurement markings (beaker volume) |
| 800 | user's field of view |
| 810 | object in field of view (cube) |
| 910 | molecule |
| 1100A | first length |
| 1100B | second length |
| 1200 | laser beam |
| 1210 | laser dot |
| 1300 | physical reference object |
| 1310 | virtual replacement digital object |
| 1400 | display device |
| 1410 | camera |
| 1500 | glove input device |
| 1510 | connected display device |

Computer-Implemented System

FIG. 1 is a schematic block diagram of an example XR device 100, such as wearable XR headset, that may be used with one or more embodiments described herein.

XR device 100 comprises one or more network interfaces 110 (e.g., wired, wireless, PLC, etc.), at least one processor 120, and a memory 140 interconnected by a system bus 150, as well as a power supply 160 (e.g., battery, plug-in adapter, solar power, etc.). XR device 100 can further include a display 170 for display of the XR learning environment, where display 170 can include a virtual reality display of a VR headset. Further, XR device 100 can include input device(s) 180, which can include audio input devices and orientation/inertial measurement devices. XR devices of the invention may connect to one or more computing systems via wired (e.g., high speed Ethernet connection) or wireless connections (e.g., high speed wireless connections), such that computer processing, particular processing requiring significant processing and power capabilities, can be carried out remotely from the display of the XR device 100 and need not be self-contained on the XR device 100.

Network interface(s) 110 include the mechanical, electrical, and signaling circuitry for communicating data over the communication links coupled to a communication network. Network interfaces 110 are configured to transmit and/or receive data using a variety of different communication protocols. As illustrated, the box representing network interfaces 110 is shown for simplicity, and it is appreciated that such interfaces may represent different types of network connections such as wireless and wired (physical) connections. Network interfaces 110 are shown separately from power supply 160, however it is appreciated that the interfaces that support PLC protocols may communicate through power supply 160 and/or may be an integral component coupled to power supply 160.

Memory 140 includes a plurality of storage locations that are addressable by processor 120 and network interfaces 110 for storing software programs and data structures associated with the embodiments described herein. In some embodiments, XR device 100 may have limited memory or no memory (e.g., no memory for storage other than for programs/processes operating on the device and associated caches). Memory 140 can include instructions executable by the processor 120 that, when executed by the processor 120, cause the processor 120 to implement aspects of the system and the methods outlined herein.

Processor 120 comprises hardware elements or logic adapted to execute the software programs (e.g., instructions) and manipulate data structures 145. An operating system 142, portions of which are typically resident in memory 140 and executed by the processor, functionally organizes XR device 100 by, inter alia, invoking operations in support of software processes and/or services executing on the device. These software processes and/or services may include Extended Reality (XR) artificial intelligence processes/services 190, which can include methods and/or implementations of standalone processes and/or modules providing functionality described herein. While XR artificial intelligence (AI) processes/services 190 are illustrated in centralized memory 140, alternative embodiments provide for the processes/services to be operated as programmed software within the network interfaces 110, such as a component of a MAC layer, and/or as part of a distributed computing network environment.

In various embodiments AI processes/services 190 may create requested digital object images via image generating AI system, such as Dall-E or Dall-E 2 (see https://openai.com/product/dall-e-2 incorporated herein by preference) or other similar image generation systems and other synthetic media. In other embodiments, an AI process/service 190 might retrieve a requested digital object image from one or more local databases, centralized databases, cloud-based databases such as Internet databases, or decentralized databases.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions.

Figure 2A:
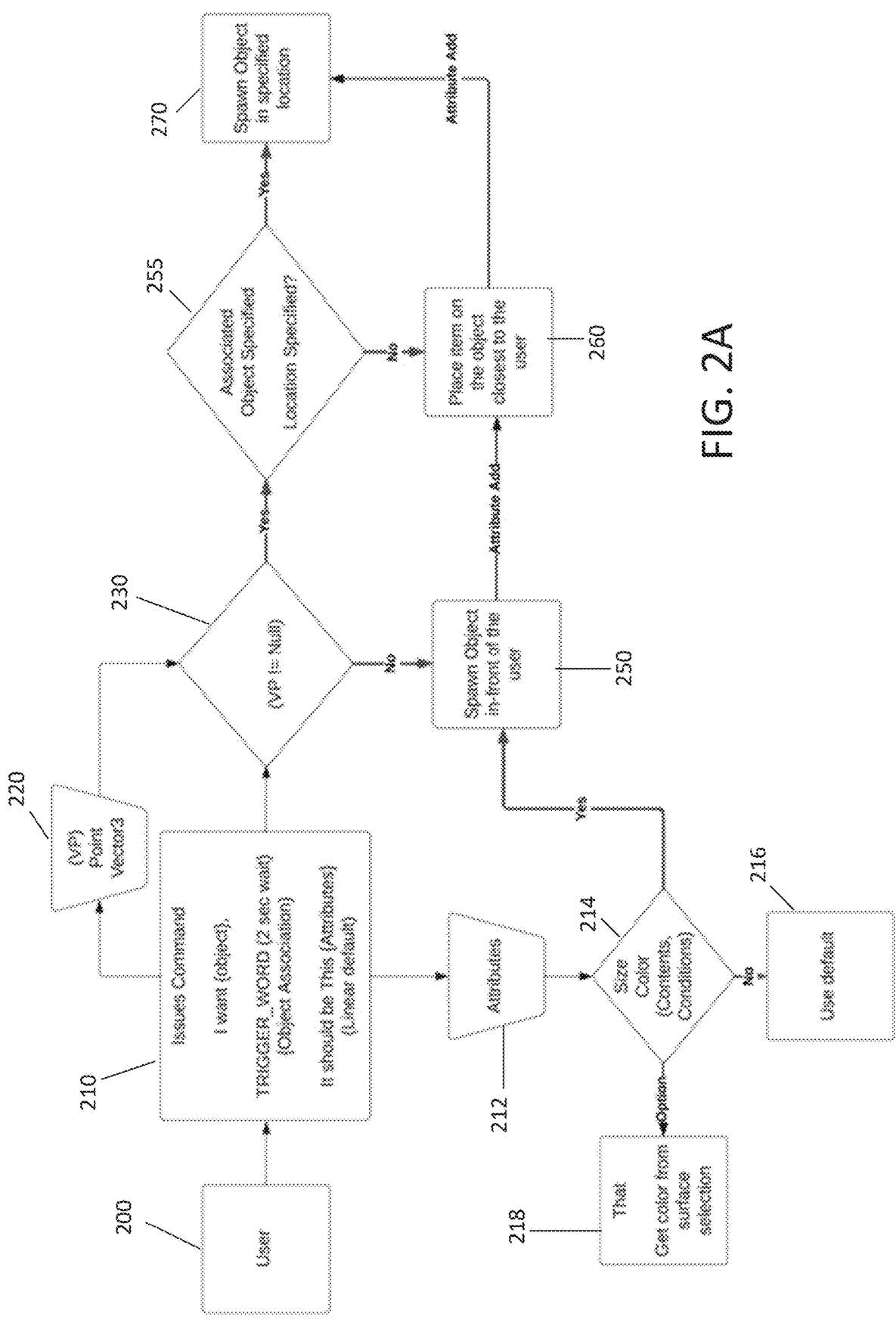
FIG. 2A is a flow diagram illustrating a method of creating digital objects when a user points and speaks for creating an object in an extended reality environment in one embodiment of the invention.

Referring to FIG. 2A, a flow diagram depicts the steps for a user in an extended reality environment to: provide a voice command for creation and manipulation of digital objects, point to specify locations for digital objects with one or more virtual hands, link or place digital objects on or in relation to one another, and assign attributes to digital objects.

A user 200 is in an XR environment and supplies input(s) to the system, such as an issue command at step 210. As an example, the user 200 might say the command "I want" and then declare a digital object that the user 200 desires to be created in the extended reality environment. The requested object is processed to be spawned into the XR environment by the system and services running in the memory 140 of the XR device 100 and the digital object can be subject to further commands, such as specifying location points for the digital object to appear, linking an object to be created with other objects that are already created or to be created, assigning attributes to digital objects, and the like. In some examples, attributes can include one or more visual attributes for generation of an object representation, such as but not limited to: type, color, size, height, volume, width, length, movement, speed, texture, location of components of the digital object and combinations thereof. Other attributes can include physical properties, owner, attachment points, and other properties that can dictate how the associated object representation interacts with aspects of the extended reality environment. Preferably, user commands include a trigger word. Trigger words provide relative information, like location and attributes, about a digital object, such as with conditions such as "here" or "there," "right there," "over there," "on top," "under," "over," "next to," "this," "that," "when," "above", "above my head," "in the air," in front of," "behind," "inside," and the like. As such, the XR device 100 can detect a voice command from a user using the extended reality environment, and can request creation of a digital object for display in the extended reality environment.

User 200 could say at step 210, "I want the cube over there". Once one or more trigger words are received by the processes of the XR device 100, the XR device 100 is activated to use one or more cameras to detect a hand 300 (see FIG. 3A) of some type. If the hand 300 of user 200 is detected, a position and/or orientation of the hand 300 can be used as input to a directional raycast operation (referred to herein as raycast 310) that can be programmed as a software process in the memory of XR device 100, which can generate a 'ray' as a visible or invisible line extending from the user's virtual finger toward a specific position of where the user wants that object to be spawned. In other examples, the XR device can display the digital object at the location point in the extended reality environment in response to a voice command alone and/or relative positions of other objects to be spawned. For example, a user could say "generate a hat about 18 inches above my head" and the XR device can determine a point 18 inches above the head of the user (as represented within the XR environment) and generate an object representation of a hat for display within the XR environment at that point. The user can specify points or locations in relation to themselves or another object within the XR environment.

Figure 12:
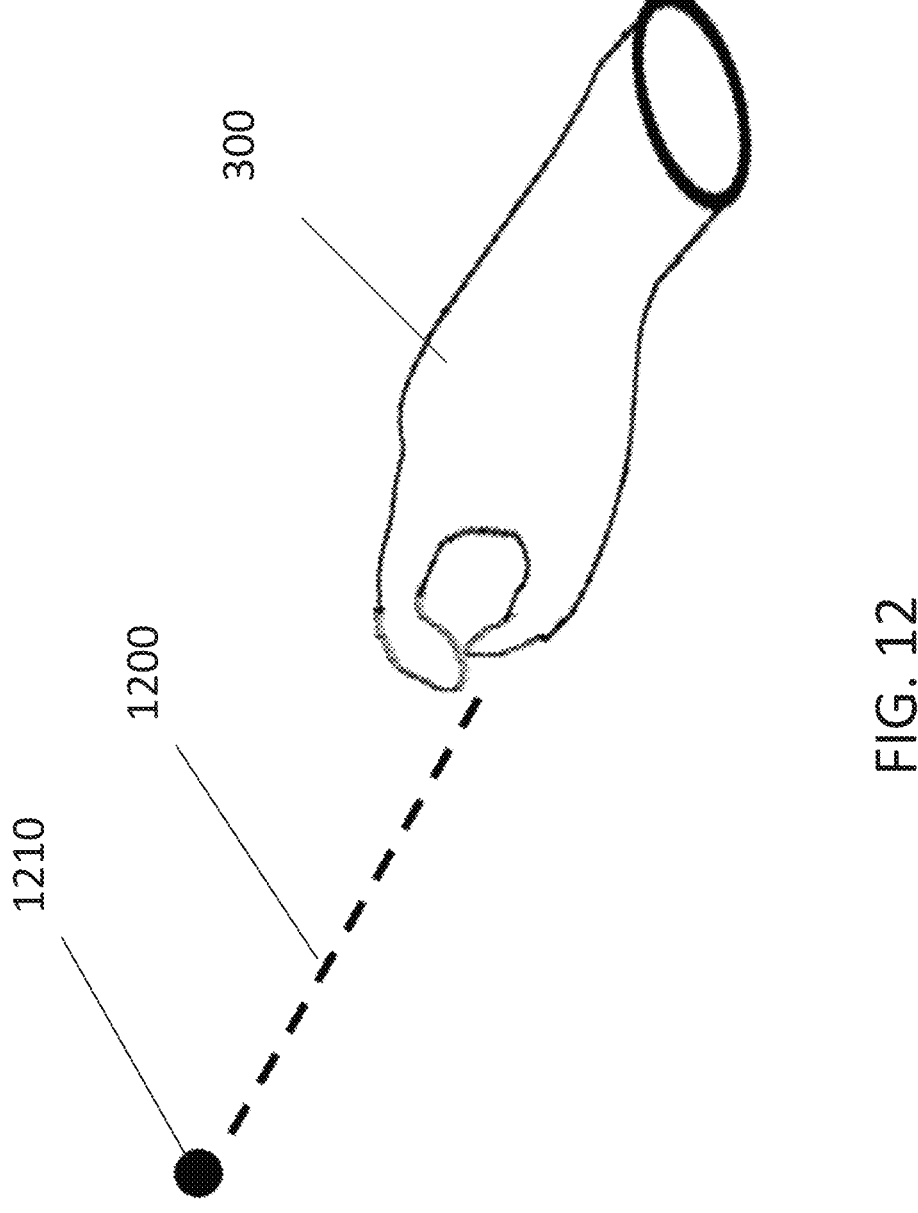
FIG. 12 is schematic diagram of pinching and creating a laser pointer with a shown laser beam and laser dot in an XR environment in an embodiment of the invention.

In further embodiments, a 'ray' from a user's hand or object can result in appearance of a laser-type dot similar to using a laser pointer. The laser beam line/ray might be shown and a laser dot be seen in the XR environment when the user's pointing, such as with a finger, physical or virtual pointer, hand, and the like, intersects with object or boundaries, i.e., the laser dot would be shown on the boundary (such as a floor or wall) or digital object (like a table) when the pointed ray intersects with the same. It will be appreciated that as the user moves the body part or pointer that the laser beam line/ray and laser-type dot will move in the XR environment with the same. In some embodiments, a hand gesture could create a virtual pointer ray in the XR environment, such as illustrated in FIG. 12. A user can pinch their pointer finger and thumb of their hand 300 together that results in a laser beam 1200 and laser-type dot 1210 that the user can move. As example, the user can move their pinched finger and thumb and visualize where they are pointing with the laser beam 1200 and where the laser dot 1210 intersects with boundaries and objects in the XR environment.

Figure 3A:
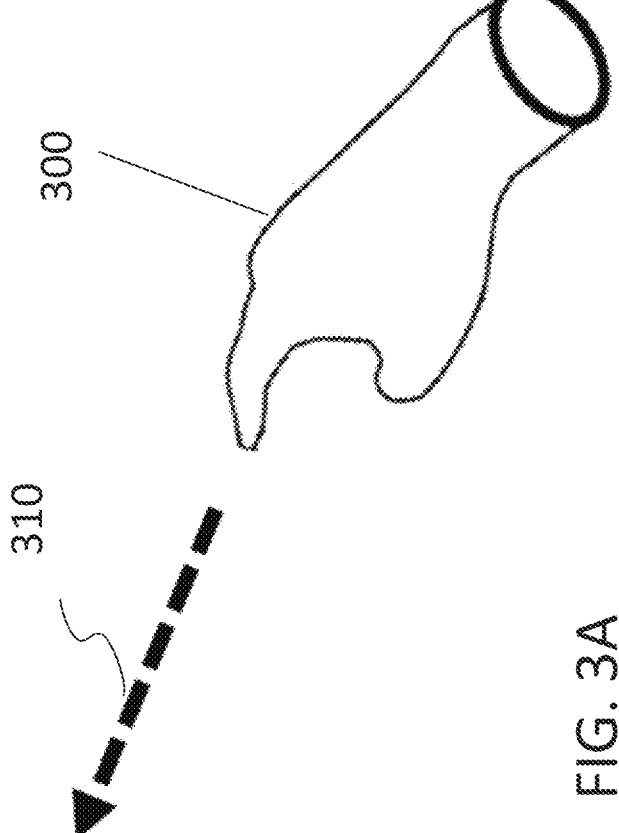
FIG. 3A is a schematic diagram of a virtual hand pointing with a directional raycast in an extended reality environment in one embodiment of the invention.

With further reference to FIG. 3A, when a user is pointing a finger, the raycast 310 sends out a 'ray' that is along the direction the finger is pointing. An intersection point where the ray meets another virtual surface, such as a virtual floor or wall, is returned as a Vector (x, y, z) at step 220, which can be interpreted as the coordinates for that location in the XR room. As such, the XR device 100 can detect a pointing action from the user at a location point in the extended reality environment. The XR device can then display the digital object at the location point in the extended reality environment in response to both the detection of the voice command and the pointing action from the user. The step of displaying the digital object can include retrieving a representation of the digital object with an artificial intelligence process that provides the representation for displaying the digital object at the location point.

Further, in some embodiments, the user is not necessarily required to form a pointing gesture with their fingers, and can use any suitable gesture, such as making a first or another motion. For example, a user can gesture using a face-down palm (e.g., "I want a flowerpot right here" while 'patting' a table surface represented within the XR environment). In another aspect, the user is not necessarily required to point to a single location. For example, the user can indicate a general range by gesturing in an arc or another pattern with a pointing finger or another suitable gesture (e.g., "Place wildflowers over here" while moving their palm across an area, which may be received by the system as a plurality of points captured sequentially over a short period of time, e.g., 1-3 seconds). Other options can include allowing the user to indicate with another area of their body, such as tapping or pointing with their foot.

In yet a further aspect, the user is not necessarily required to point with their fingers or hands to generate objects at specified locations within the XR environment. For example, the user may be able to "hold" a pointer object within the XR environment, such as a representation of a "magic wand" object, a yardstick or tape measure object, a laser pointer, a telescoping pointer or another suitable object representation. In some examples, object generation can be dependent upon the pointer object that is being used, or a setting or state associated with the pointer object, for example, if the pointer object is a yardstick, then objects generated within the XR environment can be placed at locations indicated by an end of the yardstick. In another example, if the pointer object is a tape measure, then the tape measure can be extended or retracted as needed to define a variable distance from a hand of the user at which objects can be generated within the XR environment.

Figures 13A, 13B:
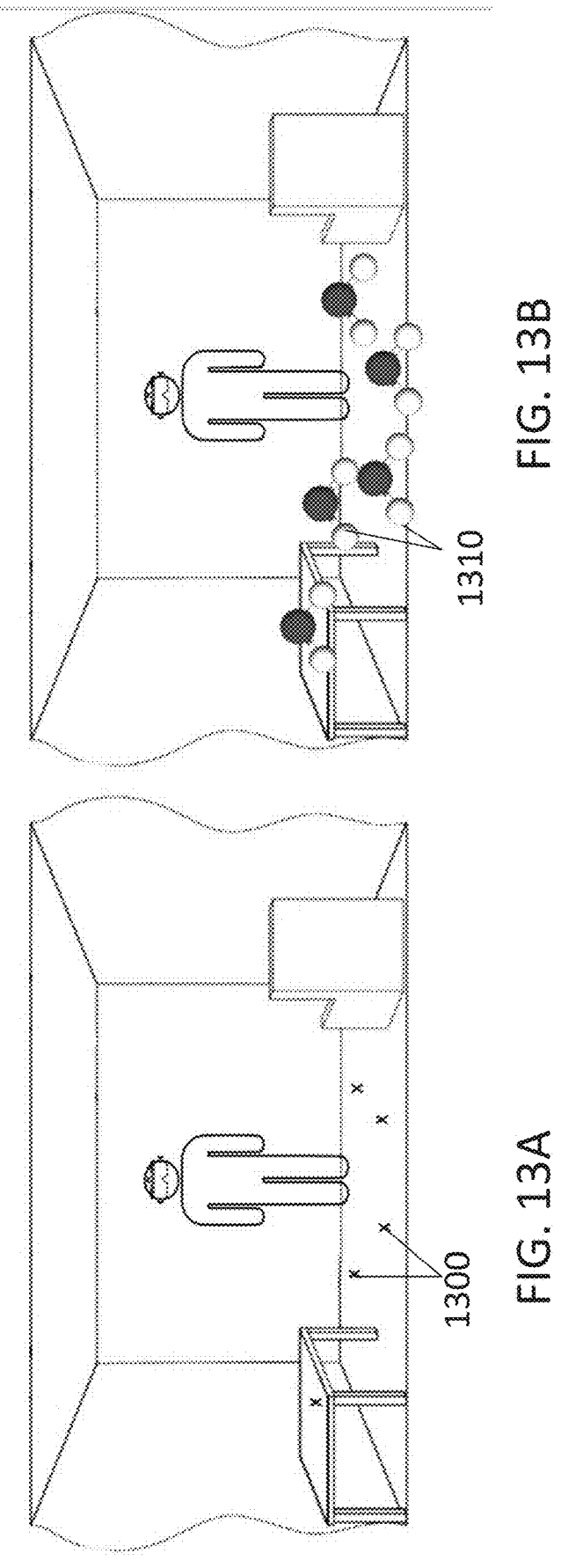
FIG. 13A is a schematic diagram of a user placing physical reference objects, such "X" markers of tape, in a real-world environment in an embodiment of the invention.
FIG. 13B is a schematic diagram of a user replacing the physical reference objects shown in FIG. 13A, such as "X" markers of tape, in an XR environment, such as an augmented reality environment, with virtual replacement objects, such as molecules, in an embodiment of the invention.
Figure 14B:
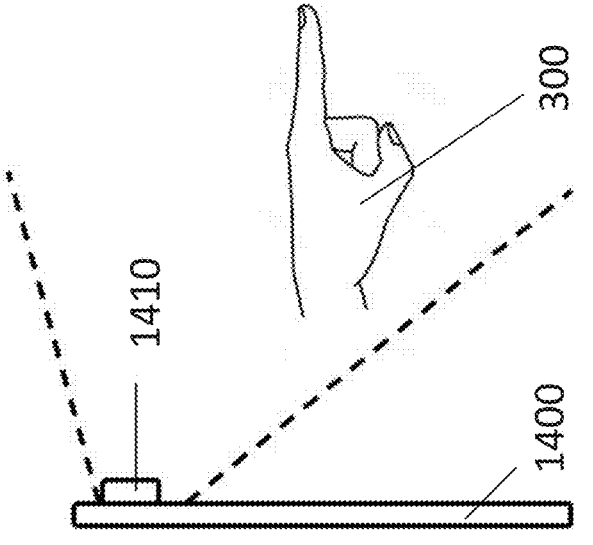
FIG. 14B is a side view schematic diagram of the schematic diagram of FIG. 14 showing the camera and user pointing in front of the camera and display device in an embodiment of the invention.
Figure 14A:
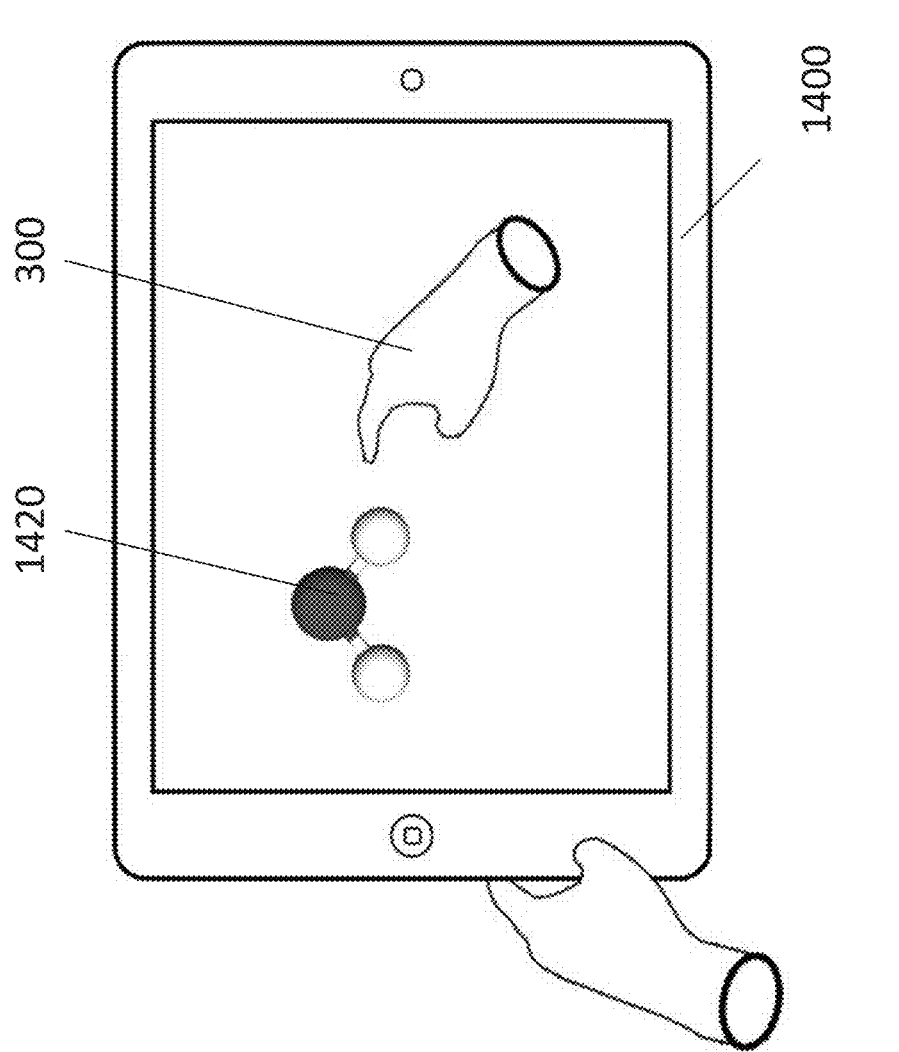
FIG. 14A is a schematic diagram of user's point of view through their eyes in the real world pointing to create an object in an XR environment using a display with a camera tracking pointing by the user's hand/finger, such as a tablet or mobile phone device, in one embodiment of the invention.
Figure 15:
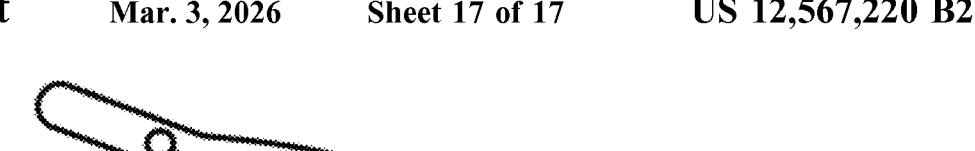
FIG. 15 is a schematic diagram of a glove input device and connected display device in one embodiment of the invention.

Referring to FIGS. 13A and 13B, in some examples, locations for object placement in the XR environment can be determined based on presence and locations of real-world physical reference objects or markers 1300 (e.g., masking tape, traffic cones, chairs, RFID tags, marker objects of a certain color, shape or symbol, etc.) that can be detected using external sensors of the XR device. For example, a teacher may set up an activity where they mark multiple locations along a floor surface in real life with masking tape, traffic cones (like orange cones) or another suitable real world physical reference object 1300, and can then go into the XR environment to specify that they want virtual digital replacement objects 1310 generated within the XR environment, such as an augmented reality environment in one embodiment, that correspond with the physical reference objects in the real world (e.g., "Place a water molecule at each "X" [or other physical reference object] on the ground in real life"). This operation can implement principles of object detection (e.g., to detect objects and markers in the real world) and object classification (e.g., to filter out real-world objects and markers that are not being targeted) to place object representations at the marked locations. It will be appreciated that all digital replacement objects 1310 need not be same, for example a teacher might specify that a "different president of the United States" be represented at each "X" and the XR platform will display a virtual representation of a different U.S. president where each X is detected from the real-world environment and the "X" locations mapped to the XR environment.

In other embodiments, tracking of a user's eyes from a head-based XR device 100 could be used to indicate direction of where objects are requested for creation in the XR environment. When a user 200 moves their eyes in a particular and requests that an object be "created 6 feet over there" or "3 feet from that table" or "where I am looking" the XR platform will determine the location of the user's gaze, similar to detecting a pointing direction and location/coordinates described herein relative to a hand and raycast but in an eye tracking embodiment, and generate appearance of the requested digital object based on the eye tracking.

At step 212, attributes that can be added to an object by detection of a spoken attribute at step 210 provide additional information about how the object should appear in the XR environment. For example, if a user speaks a size, a color or other contents or conditions at step 214, the attribute(s) are added by the artificial intelligence processes/services 190 to represent the object as the user is requesting. A user 200 can further specify the attribute at step 218, such as a color "that" is on a particular surface of a desired object (e.g., "Turn that chair dark green" or "Turn the color of that chair to match that floor tile"). In other instances, a user 200 may not be specific about a particular general attribute and the software system of the XR device 100 will use a default representation at step 216 for representing that attribute of the digital object.

Returning to step 220, when a vector three pointer is detected from a user pointing and the XR device 100 determining coordinates from raycast 310 interacting at a point of some object or boundary in the XR environment, then the location point ("point B", FIGS. 4A and 4B) is associated with creation or manipulation of an object at that location point, such as where to create the requested object, duplicating an object (see FIGS. 4A and 4B), identifying an object being pointed at the detected coordinates to for linking to other objects, interacting, changing or other activity that the user 200 commands for activity at the location point.

If the vector three pointer is detected null at step 230, the software system of the XR device 100 spawns the object at default location relative to user 200 (such as in front of the user 200) at step 250 and adds any user-requested attributes or uses default attributes where attributes are no specified or unavailable to be specified.

If detected three point vector is not null, then the software system of the XR device 100 will determine at step 255 if there is another object in the XR environment to be associated with and represented in combination with the requested digital object and if a particular location or interaction is specified with respect to the requested object and the associated object. If there is no associated object and there is a location point specified, the software system of XR device 100 creates/spawns the digital object at the specified location at step 270 that corresponds to the vector three point coordinates together with requested or default attributes as applicable. If there is both a detected associated object and location or interaction specified as between the requested digital object and the associated object, then the software system of XR device 100 creates/spawns the digital object at step 270 to represent the specified relationship with the associated object, such "on top of," "under," "attached to," "next to," and the like.

In a case where the user 200 requests creation of an object and an associated object has been detected from the vector three pointer, but the user did not specify a location or other relationship between the objects, step 260 provides an exemplary default result where the software system of XR device 100 will place the requested item closest to the user on the particular associated object.

Figure 2B:
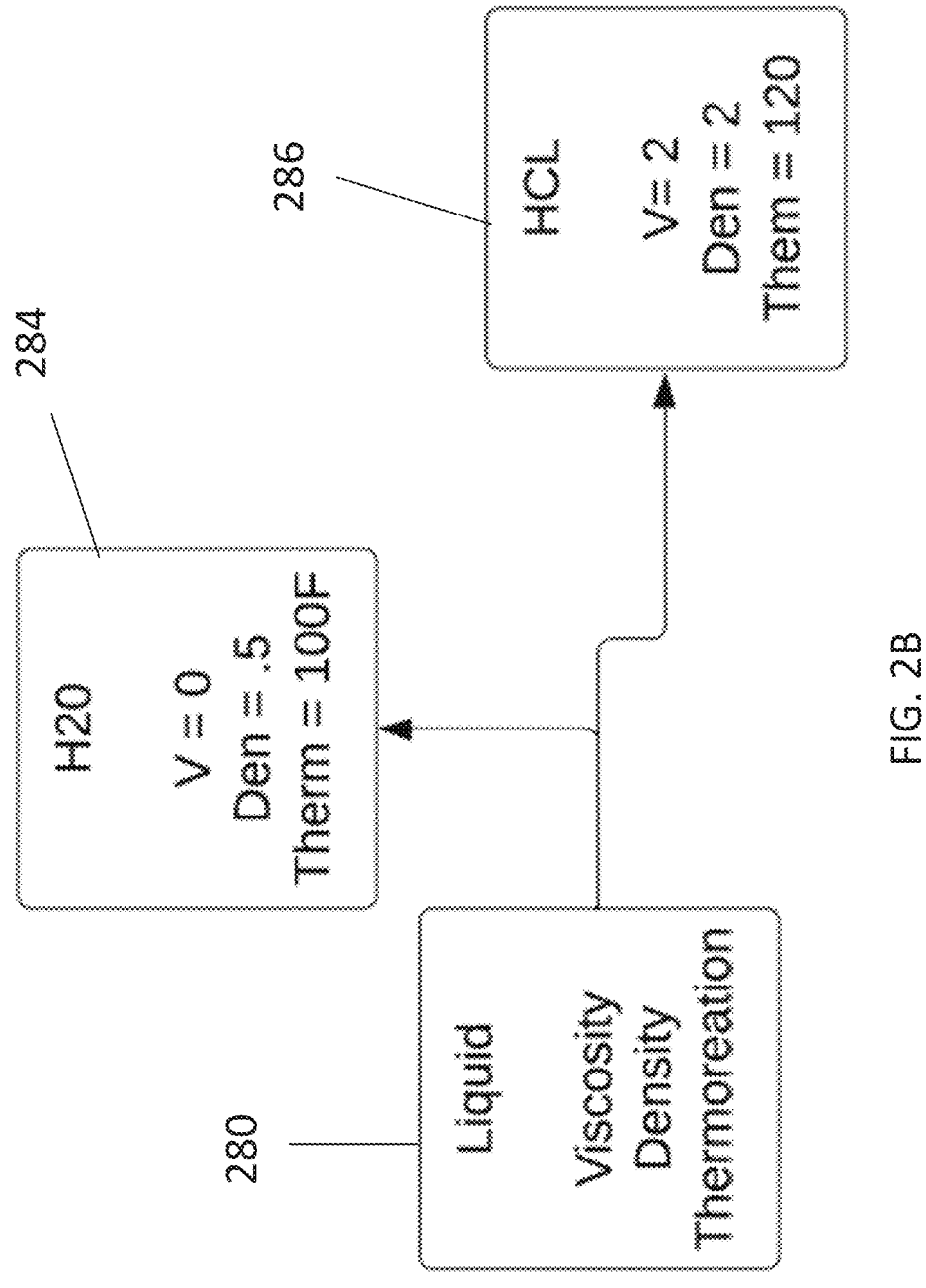
FIG. 2B is a block diagram illustrating virtual liquid attributes and values in one embodiment of the invention.

With further reference to FIG. 2B, a flow diagram shows one embodiment where a liquid viscosity, density and thermal reaction values may be assigned as attributes 280 to represent a requested liquid to be created in the XR environment. One example liquid is water ($H_2O$) with attribute values 284 and another example liquid is hydrochloric acid (HCl) with attribute values 286. By using the values of assigned attributes of represented objects, such as liquids, visual, audio and other effects can be used to generate accurate representations of the objects within the XR environment, including how they may interact with one another. In some examples, representations of how these objects interact can be programmed or arrived at through numerical simulation and analysis methods and/or by artificial intelligence processing based on the values of the respective attributes and the algorithms that define how and what is represented in the XR environment when one or more activities occurs between objects.

Referring to FIG. 3A, when a user is pointing a finger with virtual hand 300, raycast 310 (e.g., using "Raycast" from Unity development tools, or another suitable operation), sends out a preferably linear ray or line in the direction that the finger is pointing. The location point where the ray meets another surface floor or wall, is returned as a vector three pointer (VP or Point Vector3) with X, Y, Z coordinates for that location in the XR environment 10, such as a virtual reality room.

EXAMPLES

Figures 3B, 3C:
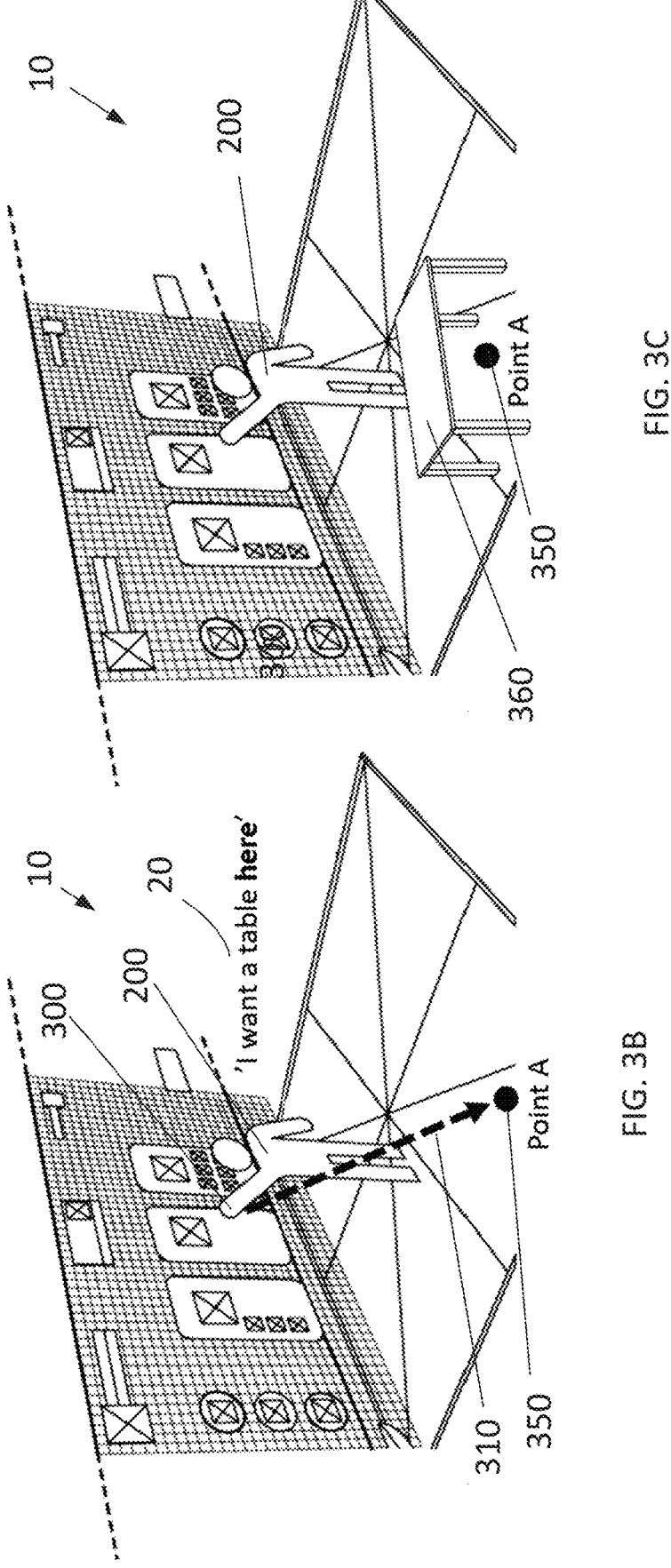
FIG. 3B is a schematic diagram of a user in an extended reality environment requesting creation of an object, such as a table, at a specific position (point A with vector three pointer coordinates) in one embodiment of the invention.
FIG. 3C is schematic diagram showing creation of the table object requested in FIG. 3B in one embodiment of the invention.

Referring to FIGS. 3B and 3C, in one embodiment, user 200 is shown in an XR environment 10, such as in a virtual room, wants to generate an object, e.g., a table, using the artificial intelligence processes of the software system of XR device 100. FIG. 3B shows the user 200 pointing their finger of virtual hand 300 and saying a voice command 20 "I want a table here." The user 200 is pointing at specific location denoted by "point A" 350. The word "here" can be a trigger word that causes the system to raycast 310 from the user's finger and locate the point 350 where the user wants to generate an object 360 (FIG. 3C). In some embodiments, trigger words such as "here" and "there" can be interchangeable if using a finger to point at specific location, but "here" without finger pointing can produce an object in front of user's face, such as appearing about 0.5 meter away from the front of the user. If the user 200 uses the trigger word "there" then the object is produced further away from the user in the XR environment than with use of "here", such as appearing about 2 meters away from the front of the user.

With continuing reference to FIGS. 3B and 3C, the location of point A 350 is returned as vector three X, Y, Z. As shown in FIG. 3C, the XR device 100 spawns the desired object 360, in this case a table, at the point 350 the user 200 requested, which is point A.

In some embodiments, a menu, such as a number of thumbnails of table images (e.g. round table, rectangular table, cocktail table, desk, and the like), may be first displayed to the user from AI process/services 190 so that a user may provide additional information about the type of table that the user wants to guide the XR system to generate a digital object that accurately represents what the user desired. In some embodiments the user might request "more choices" and be presented more thumbnail images to select from an interface of the menu a type of table that the user would like the system to generate. In other embodiments, a chatbot, text prompt or other interaction may occur between the AI process/service 190 and the user in the XR environment to obtain more information about the requested digital object before the object is generated into the XR environment. For example, an audio prompt (e.g. chatbot) might be produced to the user and ask "what shape," "what type," "what color," "what size" and like inquiries as to attributes for a requested digital object to better represent the requested object in accordance with the user's expectations.

Figures 4A, 4B:
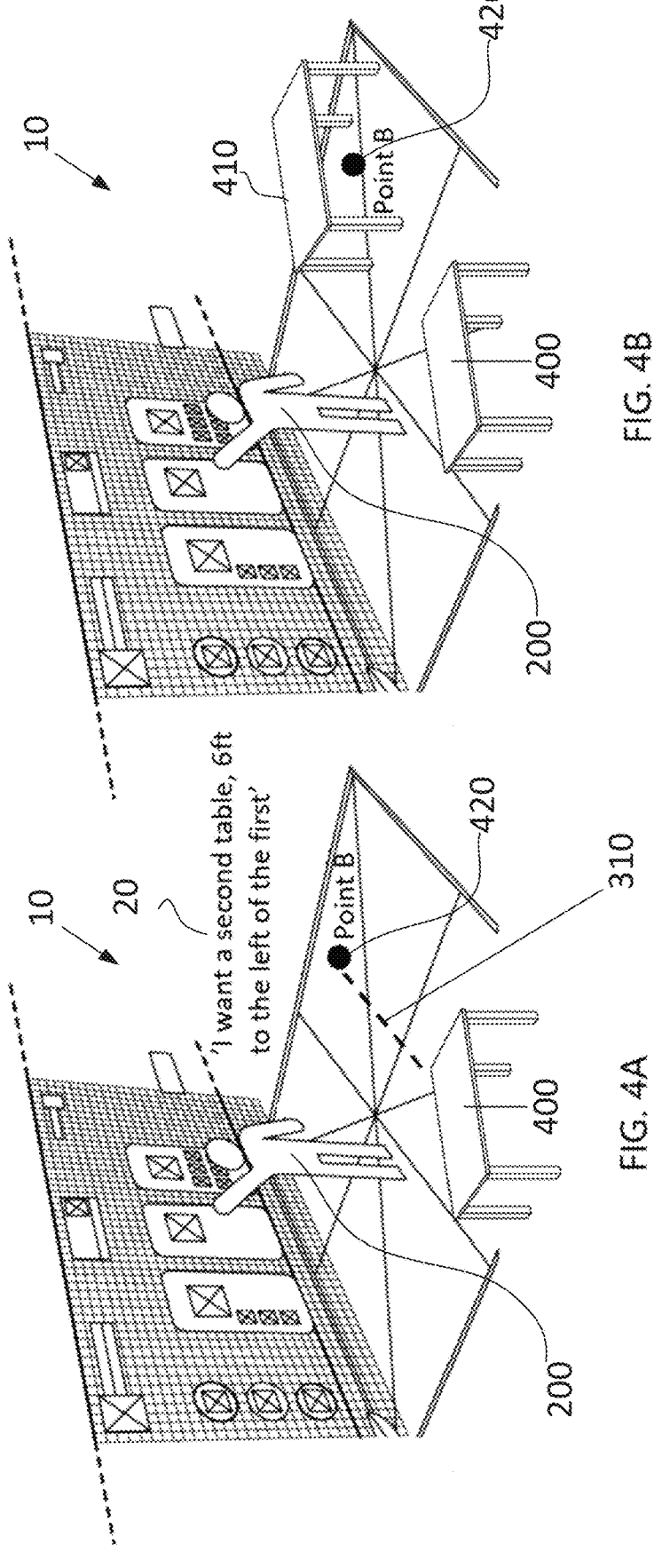
FIG. 4A is a schematic diagram of a user in an extended reality environment requesting duplication of an object, such as a table, at a specific distance in one embodiment of the invention.
FIG. 4B is schematic diagram showing duplication of the table object requested in FIG. 4A in one embodiment of the invention.

Referring to FIGS. 4A and 4B, schematic diagrams show the user 200 in a virtual room of an XR environment requesting duplication of an existing object, like a table object 400. User 200 in a VR room can say a voice command 20 "I want another table about 6 feet to the right" or "Duplicate table 6 feet to the left" or similar commands with trigger word and specification of a location attribute, such as distance and direction.

The user could also say they want an identical table for an exact reproduction of the existing table object 400 with the same attributes, or could provide voice commands with other attributes, such as a different size, height or color, of the second table object 410 being created.

In embodiments where relative distance in the XR environment is specified by the user, such as "put a kite 100 feet above my head," the AI process/service 190 can determine relative distance from determining the real world physical height of the user or distance from the ground to headset device, hands or controller to the floor, such as from camera detection, user height entry to the platform, laser detection, gyroscope measurement, and like known distance measure techniques, to generate the requested digital asset at relative requested distances for appearance in the XR environment. By knowing the relative distance of objects and boundaries in XR, the user 200 can more accurately and precisely place, move, remove and interact with digital assets in the XR environment. A user may turn on or off the display of distances by voice command or providing inputs (such as from a hand, hand gesture or controller) to the XR platform to activate or deactivate such display of distance. For example, a use could say "show distances on" or "show distances off." In other embodiments, a control input, menu interface or setting selection in the XR environment could turn distances display on and off.

In some embodiments when distances display is activated, text may appear on objects and boundaries that indicates the distances of different objects and boundaries away from the user in the XR environment, such as "15 ft" shown on a wall, "10 ft" on an instructor's desk in front of the wall, and "1 foot" for a lab table near the user. In other embodiments, virtual rings, such as including incremental distance text and/or difference colors for each ring, could be displayed concentrically outward from the user, wherein the user can see a ring at different distances, such as "2 meters" at ring 1, "4 meters" at ring 2, "6 meters" at ring 3, and so on. These increments need not be fixed distance intervals and could be displayed as readily seen by the user such as on the floor or ground of the XR environment, as transparent rings floating around the user, and the like, which can intersect with objects so that a user sees relative distances of objects in the XR environment based on which ring intersects or is near a respective object.

In other embodiments, a user 200 can speak to the XR platform with a request such as "what is the distance of the table from me" and the XR system will respond, such as audibly, text display and/or combinations thereof, with the relative distance of that requested object according to the associated distance data between the user and object.

With further reference also to FIGS. 3B and 3C, a user 200 can also specify creation or duplication of digital objects relative to a body part or body parts. Such as "create ball 6 inches from my hand," "place ball 6 inches in front of my foot," "generate table 7 meters from my hands," and like distance-specifying requests. In some embodiments, the user 200 may also point and say, "place desk 6 feet in front of me over there," and the XR platform will generate appearance of the desk 6 feet from the end of the user's pointing reference, such as a finger, hand or with a pointing object, away from the user's reference and in the direction of the pointing.

In some embodiments, a user 200 can see or receive XR distances of objects, boundaries (like walls) and the like, via text, audio feedback and graphical representation, and the like in the XR environment. For example, In this example shown in FIG. 4A, a raycast 310 is created from the existing table object 400 to the distance (6 ft) at the spawn location at specified location point B 420. As shown in FIG. 4B, the created or duplicated table object 410, which may be identical or non-identical as noted, is spawned at the determined location "point B" 420. In some embodiments, the vector three point location (X, Y, Z coordinates) of the existing table object 400 is used by the software system to determine the vector three point location (X, Y, Z) coordinates of replicated table object 410 at location point B 420.

Figure 5B:
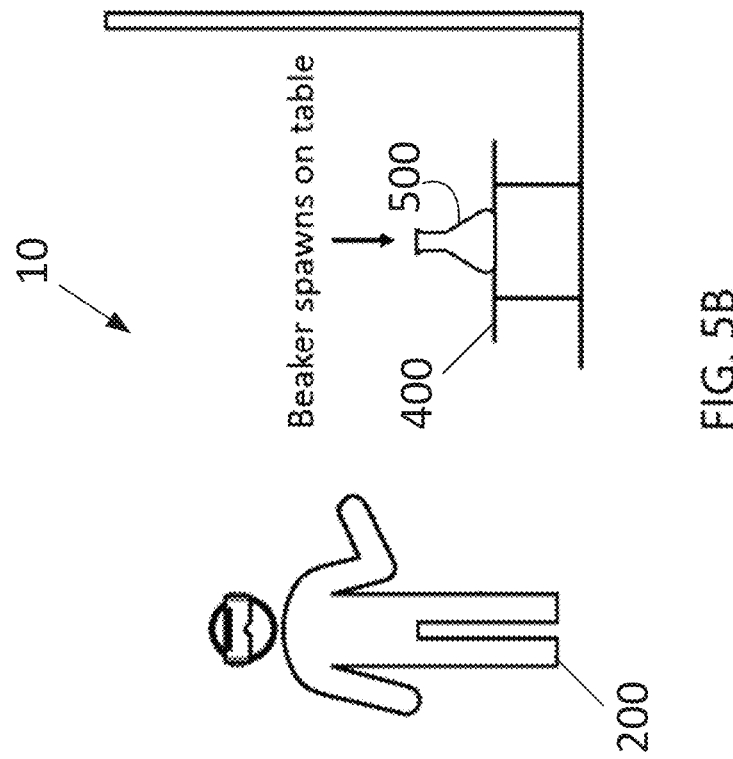
FIG. 5B is a schematic diagram illustrating creation of a beaker on top of a table according to the user request shown in FIG. 5A in one embodiment of the invention.
Figure 5A:
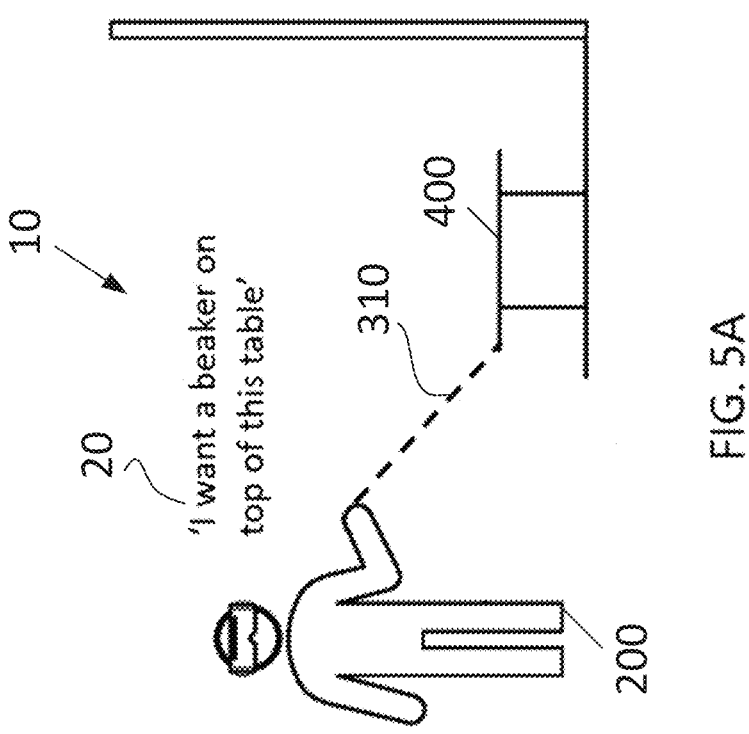
FIG. 5A is a schematic diagram of a user in an extended reality environment requesting a second object, such as a beaker, to be created on top of a first object, such as a table, in one embodiment of the invention.

Referring to FIGS. 5A and 5B, another example of user 200 requesting a second object, such as a beaker object 500, to be placed on (or other positioned relative to or having an interaction or activity with) the (first) table object 400 in an XR environment 10 is shown. User 200 can say a voice command 20 "I want a beaker on top of this table" while pointing at the table object 400 to cause raycast 310 to cast a ray at the table and intersect with the table object 400. The software system of XR device 100 possess the location Vector3 (x, y, z) of the table, including the top location of the table. The system then uses the location and the instructions from the user to spawn a beaker object 500 object on top of the table object 400 as shown in FIG. 5B.

Figure 6B:
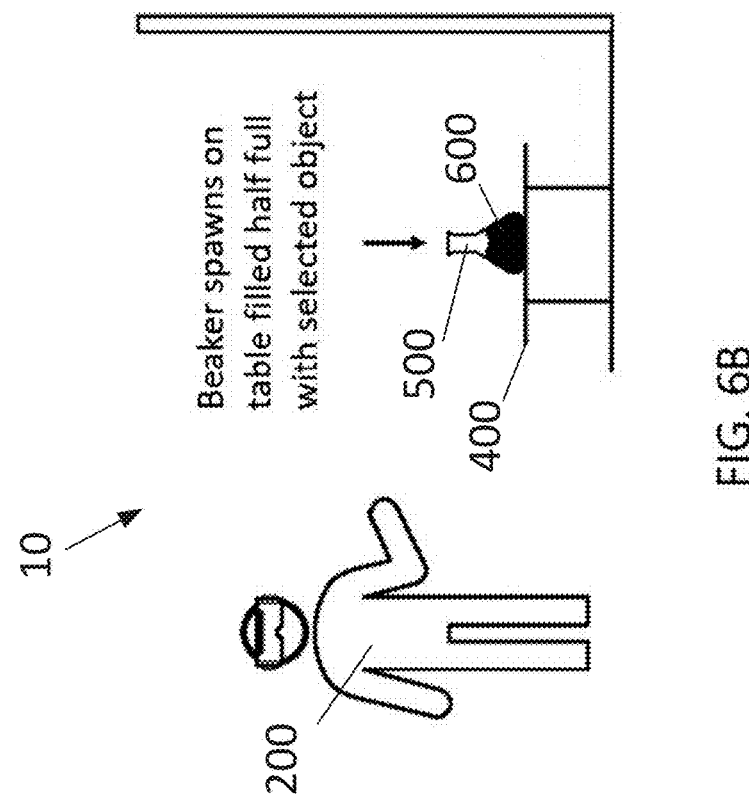
FIG. 6B is a schematic diagram illustrating creation of a beaker including a requested volume of water on top of a table according to the user request shown in FIG. 5A in one embodiment of the invention.
Figure 6A:
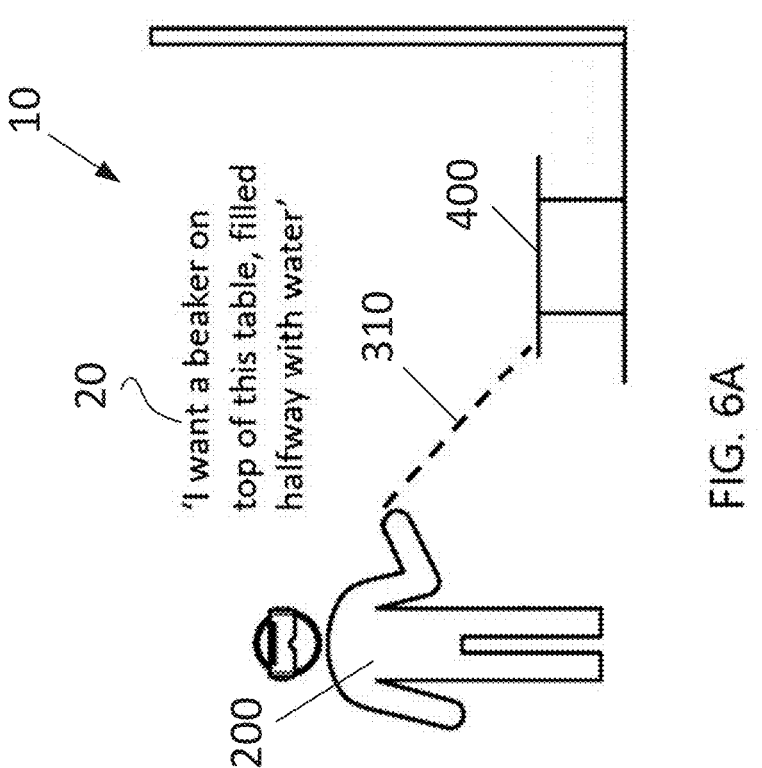
FIG. 6A is a schematic diagram of a user in an extended reality environment requesting a second object, such as a beaker, to be created on top of a first object, such as a table, and the second object (beaker) to include or be filled with a third object to a certain level of the second object (beaker), such as with water, in one embodiment of the invention.

With reference to FIGS. 6A and 6B, schematic diagrams illustrate the user 200 in an XR environment 10 that has additional information to represent with respect to a spawned object, such as filling or including liquid in a beaker object 500 on top of table object 400. User 200 in a VR room might want to fill an object (the beaker on the table) with another object (water/H2O). The user 200 can say the voice command 20 'I want a beaker on top of this table' while pointing at the table, 'filled halfway with water'. These object generations will follow the examples of FIGS. 4A-5B for generating an object, but including adding attributes and/or objects to the input(s). The XR device software system spawns the beaker object 500 filled halfway with water object 600 like the user 200 requested. As shown in FIG. 6A, the user 200 is also pointing to invoke the raycast operation to specify the top of the specific table object 400 that the beaker object 500 half-filled with water object 600 should be located.

Figures 7A, 7B, 7C:
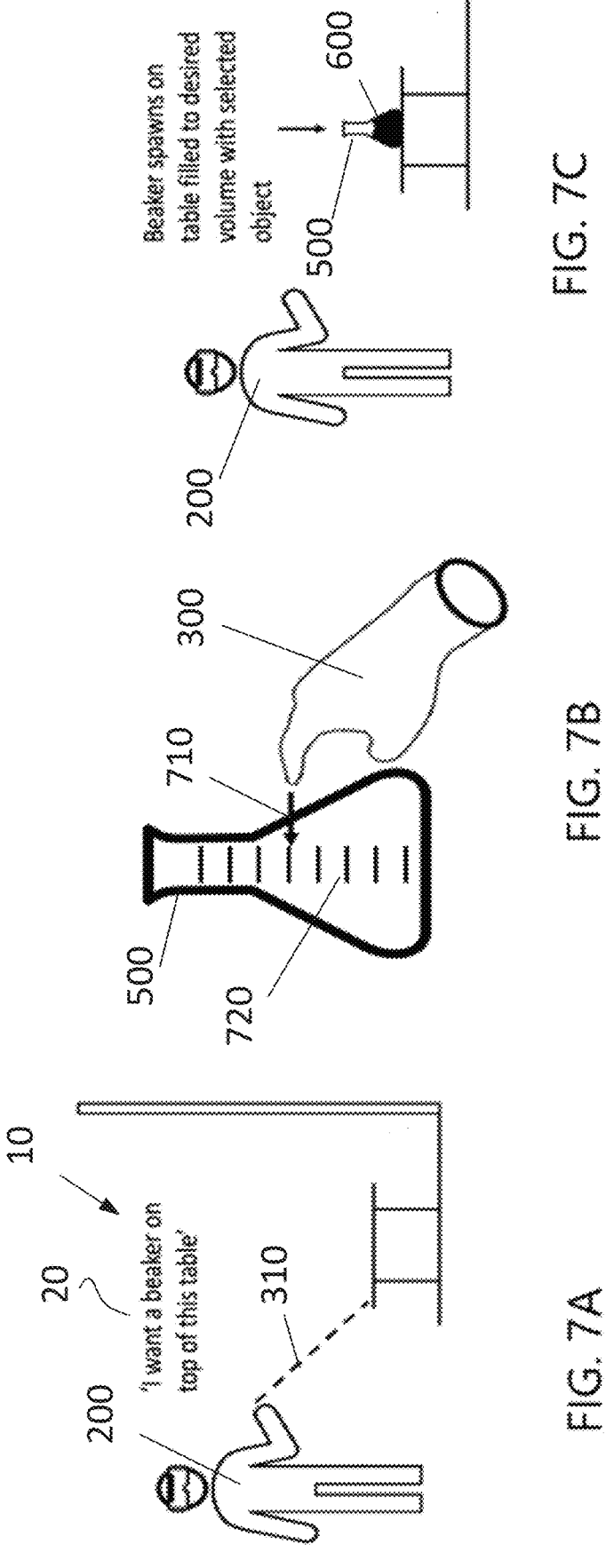
FIG. 7A is a schematic diagram of a user in an extended reality environment requesting a second object, such as a beaker, to be created on top of a first object, such as a table, in one embodiment of the invention.
FIG. 7B is a schematic diagram of a focused view and interface of the requested second object (beaker) of FIG. 7A with volume markings for a user to interact with the focused view and interface with their virtual pointing hand to select a volume level of a liquid to include in the second object (beaker) in one embodiment of the invention.
FIG. 7C is a schematic diagram illustrating creation of a beaker including a requested volume of water on top of a table according to the user volume selection shown in FIG. 7B in one embodiment of the invention.

Referring to FIGS. 7A-7C, a user 200 in a VR room in an XR environment may want a highly specific volume of liquid, such as water, to be included in another object, like beaker object 500. The user could say a voice command 20 'I want a beaker on top of this table' while pointing at the table to invoke raycast 310 (FIG. 7A) and then once the empty beaker object 500 appears on the table object, the user 200 could say 'filled up to here' while pointing at the height

710 they want water object 600 filled in the beaker object 500 (FIG. 7B), such as based on volume markings 720, or other measurement markings in other embodiments, that can be provided in a focused view or interface, so that the user can select the amount, distance, height, size and other attributes for representing the virtual objects being specified in relations to one another. Based on the user's pointing with virtual hand 300 and raycast operation, the system then fills up the beaker object 500 to the user's specific selected volume (FIG. 7C). The XR device 100 identifies the table object and what beaker object to display interactions or relative positioning with because the user is pointing at the objects.

Figures 8A, 8B:
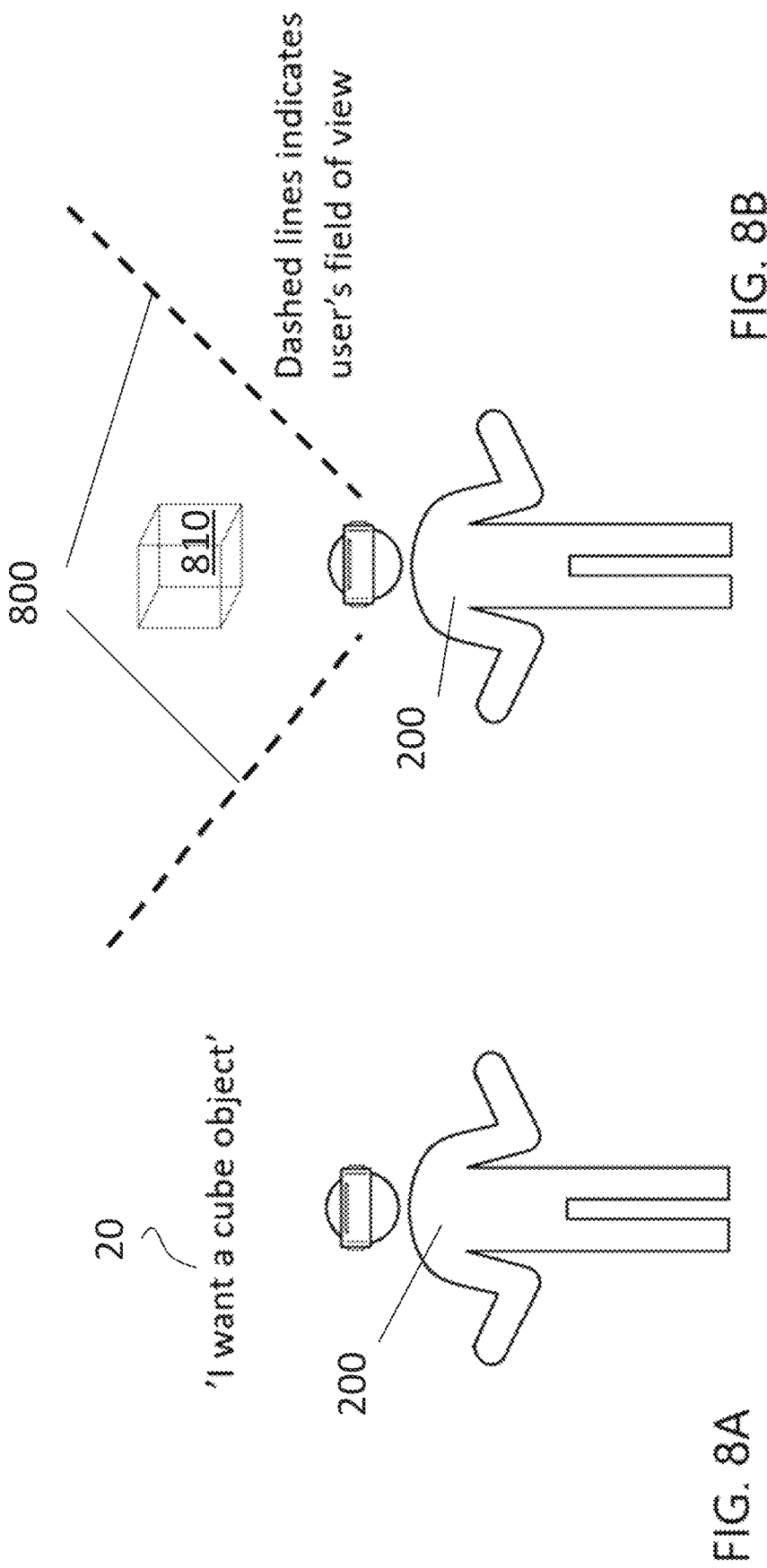
FIG. 8A is a schematic diagram of a user in an extended reality environment requesting a digital object, such as a cube, without specifying by pointing at a location for creation of the object, in one embodiment of the invention.
FIG. 8B is a schematic diagram illustrating creation of a cube object \according to the user request shown in FIG. 8B wherein the user's field of vision is used for determining a location for creation of the cube objection in the extended reality environment in one embodiment of the invention.

Referring to FIGS. 8A and 8B, in another example, the user 200 can spawn an object based on field of vision in the VR environment instead of specifically by pointing with a hand or finger. User 200 in a VR room of an XR environment could seek to generate an object using voice command 20 'I want a cube object' but does not specify where either verbally or by pointing at spot or another object in the VR environment. The XR device 100 recognizes what object the user wants, a cube, but since there is no spawn location indicated by the user, the system needs a default position or other programmed guidelines to determine where the cube object 810 should spawn. In one embodiment, the cube object 810 spawns in front of the user based on a field of view 800 of the user, such as within the center of the field of view 800. In a preferred embodiment, the distance the cube object 810 is spawned away from the user, is within an arm-length distance so that the user 200 can grab and interact (move, scale, and the like) the object 810 however they would like.

Figure 9B:
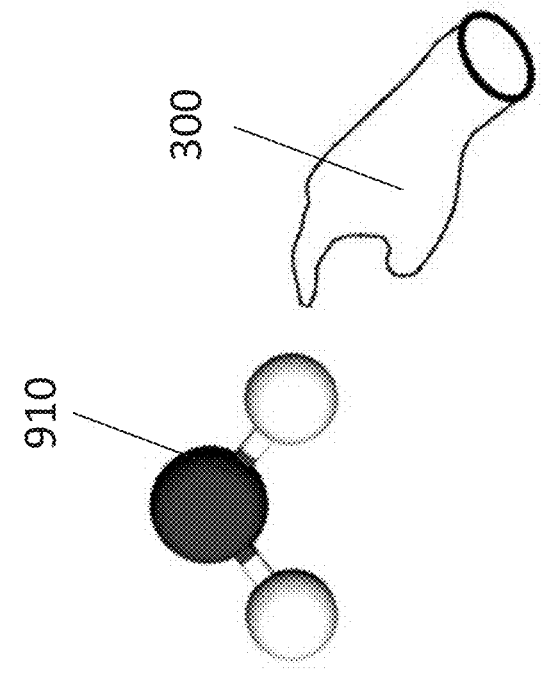
FIG. 9B is a schematic diagram illustrating creation of a molecule according to the user location request shown in FIG. 9A in one embodiment of the invention.
Figure 9A:
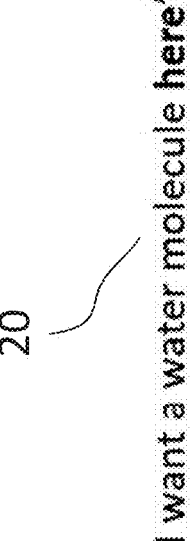
FIG. 9A is a schematic diagram of a user in an extended reality environment requesting a digital object, such as a molecule, while point with virtual hand to indicate where to spawn the digital objection relative to the user's point of view, in one embodiment of the invention.
Figure 9A:
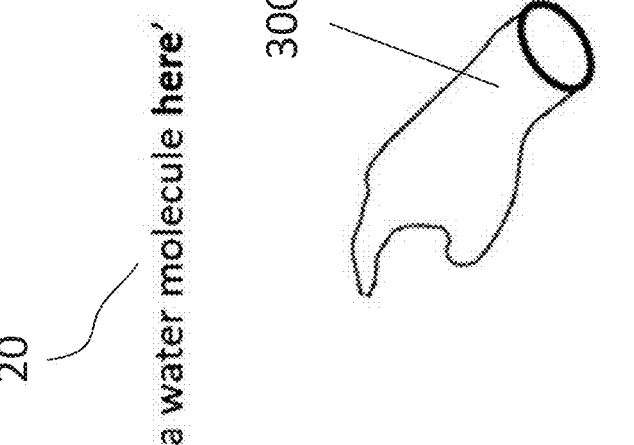

Referring to FIGS. 9A and 9B, a user in a VR room of XR environment 10 that wants to generate an object 910, such as a molecule, at point location in space, and can use the speech command 20 'I want a water molecule here' and points with the user's virtual hand 300 where the user want the object spawned. If the raycast returns a location that is not in the user's field of view, or returns a location that is too far for the user to reach the object, the system will instead by default spawn the object 910 within reaching distance of where the user was pointing and within the user's point of view (POV).

Figures 10A, 10B, 10C:
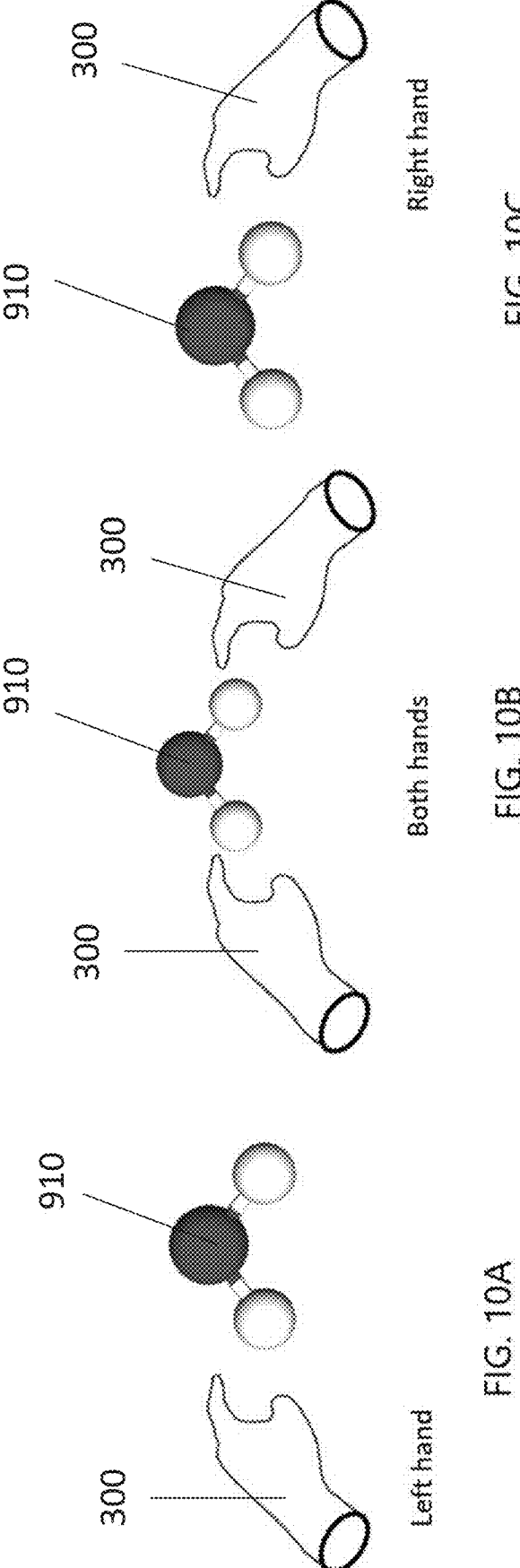
FIG. 10A is a schematic diagram of a virtual pointing left hand in an extended reality environment whereby a corresponding digital object, such as a molecule, is spawned to the right of the virtual left hand in one embodiment of the invention.
FIG. 10B is a schematic diagram of virtual pointing left and right hands in an extended reality environment whereby a corresponding digital object, such as a molecule, is spawned between the virtual pointing hands in one embodiment of the invention.
FIG. 10C is a schematic diagram of virtual pointing right hand in an extended reality environment whereby a corresponding digital object, such as a molecule, is spawned to the left of the virtual pointing right hand in one embodiment of the invention.

Referring to FIGS. 10A-10C, an XR device 100 will spawn a requested object 910 at a location in the XR environment 10 that depends on which hand(s) the user 200 uses to indicate the spawn location. The object should preferably spawn in the center of the user's view and preferably within reaching distance. If location is indicated with left hand as shown in FIG. 10A, the object 910 preferably spawns just to the right of the user's left hand 300, so that it is in the center of the user's view. The object preferably does not spawn to the left of the user's virtual left hand 300 because that is farther away from the center of the user's field of view. If a pointed location is indicated with the right hand 300 as in FIG. 10C, the object preferably spawns closer to the center of the user's field of view, which is to the left of the virtual right hand 300. If the pointed to location is indicated with both virtual hands 300, the object 910 preferably spawns in the center between both of those hands, within the center of the user's field of view.

In another embodiment, a user may specify "I want [object] at end of my finger" as a voice command. Or a user could indicate "I want [object] in palm of my hand". In such instances, the requested object would respectively appears as requested using detection of the user's hand, palm or other body part (e.g., a user could request a soccer ball at their right foot and such ball would be generated at the right foot).

In another embodiment, an XR system of the invention can detect the positioning of a user's fingers or hands as being a certain distance or shape to specify creation of an [object] that is "this big". When making the voice command to generate something "this big," the user could be forming their hand into a curled shape, fist, ball or the like and the system will generate the requested object to that gestured size. The user might also indicate a small size of a digital object with distance between fingers (like between a thumb and index finger) to generate a digital object that is sized to that indicated gap of the distance between fingers of the hand gesture. Accordingly, not only is distance between separate hands able to indicate sizing of generated objects, but a single hand and detection of distance between fingers can inform the system of the desired size of the requested digital object.

In another embodiment, a user can use one hand or both hands to indicate a shape by the gesture of the hand or both hands that is requested for the digital object. For example, a user could request a "table here" and also gesture an oval or rounded shape with one or both hands and the AI process 190 will generate a representation of a round table and not a rectangular table. In a different embodiment, the user might request a "table here" and use a hand or both hands in a "flat" shape gesture which may be understood by the AI process 190 as a request for a rectangular table with corners—and such rectangular table will be generated by the XR system and not a round table.

AI Creation of Digital Objects in Education

In adopting using of XR technologies and device, teachers want to create lessons like a teacher who wants kids to walk from station to station in VR, pouring water or rice from different size pitchers/beakers into different size objects to understand the volume of the water or rice is the same no matter what object the added substance is in. In another example, a math teacher may want to have kids pour water from a pyramid into a rectangular prism to see that the pyramid is ½ the volume of the prism. Teachers don't typically have students pour liquids or objects in the real world since the same makes a mess. But in VR teachers can readily provide for such lessons without students creating a mess, but need a user-friendly system and method for creating such lessons that don't require typical expensive programming with XR development tools and code by programming experts.

The systems and methods described herein enable teachers to use artificial intelligence software processes in conjunction with XR devices and intuitive voice commands and pointing action have the XR software build environments, lessons, objects, activities and the like, based on the teacher's interaction with the object creation and manipulation software system and not reliance on complex programming or complex inputs, such as coordinates input or specific text that translates into virtual distances, angles and the like.

Instead of teacher having to type: "I want a second table to the left of the first table but offset by 45 degrees and 6 feet away, and another table to the left of that table," a teacher can simply walk around in a virtual reality room and use their finger and voice commands to point out where they want things. The teacher can say the trigger word 'here' so that the AI processes can locate where to put something. So, "put a table *here* that looks like "that table", and I want *this table* to be as wide as *that table* but only *this tall.*". This combination of voice commands and pointing, preferably by hand, but might also be with control input devices such as controllers and electronic pointers, enables a teacher to quickly create and place objects and assign attributes to objects within an XR environment.

In some embodiments, visual and audio actions may be assigned to objects, such as based on student interactions with one or more object in a lesson. For example, if a student tries an activity on an object specified by the teacher as "here", if the student carries out the activity right, the teacher can specify that fireworks appear up "there" and these lesson interactions will be saved for the students based on the teacher's creation. If the student incorrectly carries out the activity, a teacher can specify that the wrong activity should cause my avatar to pop up "right here" and "face that way" and provide encouragement or feedback for the student to try the activity again. In these scenarios, the teacher not only creates objects and locations for objects, but can create "if" and "then" conditions for other objects or virtual activities to appear to the student engaging with the virtual lesson and XR environment that the teacher created.

In some embodiments, moving objects might also be created by method of the invention, such as a teacher in a creation mode, e.g. "lesson creation mode," of the XR environment saying: 'I want to show a ball, rolling down the steps, and I want the steps to be this tall off the ground (while pointing to a relative height in the XR environment), and they should all be the same height off the ground.' The ease of creation by pointing and relative virtual distance/heights/measurement is more advantageous than having to exactly how tall each of the steps are, where they go and what height the entire staircase is. It will be appreciated that is faster for a user to walk through XR environments creating a lesson setup without stopping to think of exactly how tall what you want something to be . . . and easier and more intuitive for a user that is creating to just point or motion or gesture towards something to create or change a digital object. Further, rather than specifying the width and size of an object, a teacher could say: "now on this table, I would like to have a bowl that is this wide" and the teacher extends 2 hands out as if they are holding a bowl. Through use of the XR device cameras and hand tracking, the size of the bowl can be based on the distance between the teacher's hands so that the "mimed" bowl in virtual reality is generated and displayed in virtual reality based on the VR miming gesture and hand distances.

In some embodiments, relative speed of objects may also be assigned by a user that is creating or changing objects in an XR environment by hand (or control device) movement. A teacher might say the teacher wants a ball "this wide" (while using hand gestures in XR to show the size of the ball) and that is going down "these" steps, and moving at "this speed" (while the user moves a virtual hand or hands down the steps, pointing to where it goes at the relative speed of the hand movement). The teacher could also provide a spoke command and "I want it to stop on 'this step'." The software system of the XR device displays all of the requested features and motion consistent with the teacher's request, including the ball stopping on the specified step.

In another use case, a teacher in an XR creation environment could say: "I want a ball that is 'this' big and I want it on a string coming down from the ceiling and I want it to swing back and forth on 'this path', and at 'this speed'. And after it swings back and forth the first time, I want the speed to go down to 'this' speed."

Another example could include: "I want a graph floating 'over here' (while gesturing) that is 'this big' (while gesturing) and then I want a parabola that goes 'just like this' through the air (while gesturing), following 'this' path (while gesturing) and at 'this' speed (while gesturing)."

In some embodiments, a user might also specify where component parts of a digital object should be shown, such as specifying (and pointing) where oxygen and hydrogen atoms should be shown on a water molecule by saying "hydrogen atom 'here'".

In some embodiments, users can set boundaries or restrictions on what can be done with or where created objects can be moved. A teacher might state that they do not want students to be able to move the objects off of 'this' table. They can pick up the objects, but they cannot lift them higher than right 'here' (while gesturing). if the student does this, the object falls down to table or just stops and stays right there in the air where the boundary is." As similar restriction a teacher could state: 'not only do I want students not to be able to take objects off 'this' table, but 'this object right here' (while pointing at the same) I want to only be able to go from 'here' (while pointing) to 'here' (while pointing) so that the students do not make a mess and it stays nicely for the next student. In another embodiment, a teacher could say: "I want an invisible tube right 'here' that only allows students to raise this object up and down inside of the invisible tube I am making with my hands right now (while gesturing an invisible tube)."

In another example, a flag could be assigned attribute to wave, but also further attributes of how far it can or where it should not wave. Similarly, a teacher could say "I want students to be able to flip coins, so put several coins on 'this' table (while gesturing). But don't let students flip the coins anywhere past 'here. (While gesturing). If they do flip past 'here,' the coin disappears in the air so the students know they should go and get another coin." Another option would be for the coins to "bounce off this invisible wall right 'here' if the students try to toss or throw coins around."

In a further embodiment, a user, such as a tutor can specify by pointing at particular objects even where there are more of the same object present in the XR environment, such as saying "these two blocks' (while pointing at the same) should be magnetic, and they should stick to each other when the students put them together. 'Those objects over there' (while gesturing) should not be magnetic. 'Such specification could also be done by specifying an attribute requirement, such as color, and saying 'only the blocks of the same color as 'these two' objects should be magnetic for students."

It will be appreciated that users could also correct or change objects created in XR environments with methods of the invention by stating a corrective action, such as a user saying: "create a table here" and then after that's done, the user could say, "no, I want the table to stop 'here'". So, the user can tell the artificial intelligence process how to make the table up front, or can have the AI do an initial creation and then the user uses their pointing in a corrective phase, so to as correct things that AI did not create as intended on the initial attempt.

Figures 11A, 11B:
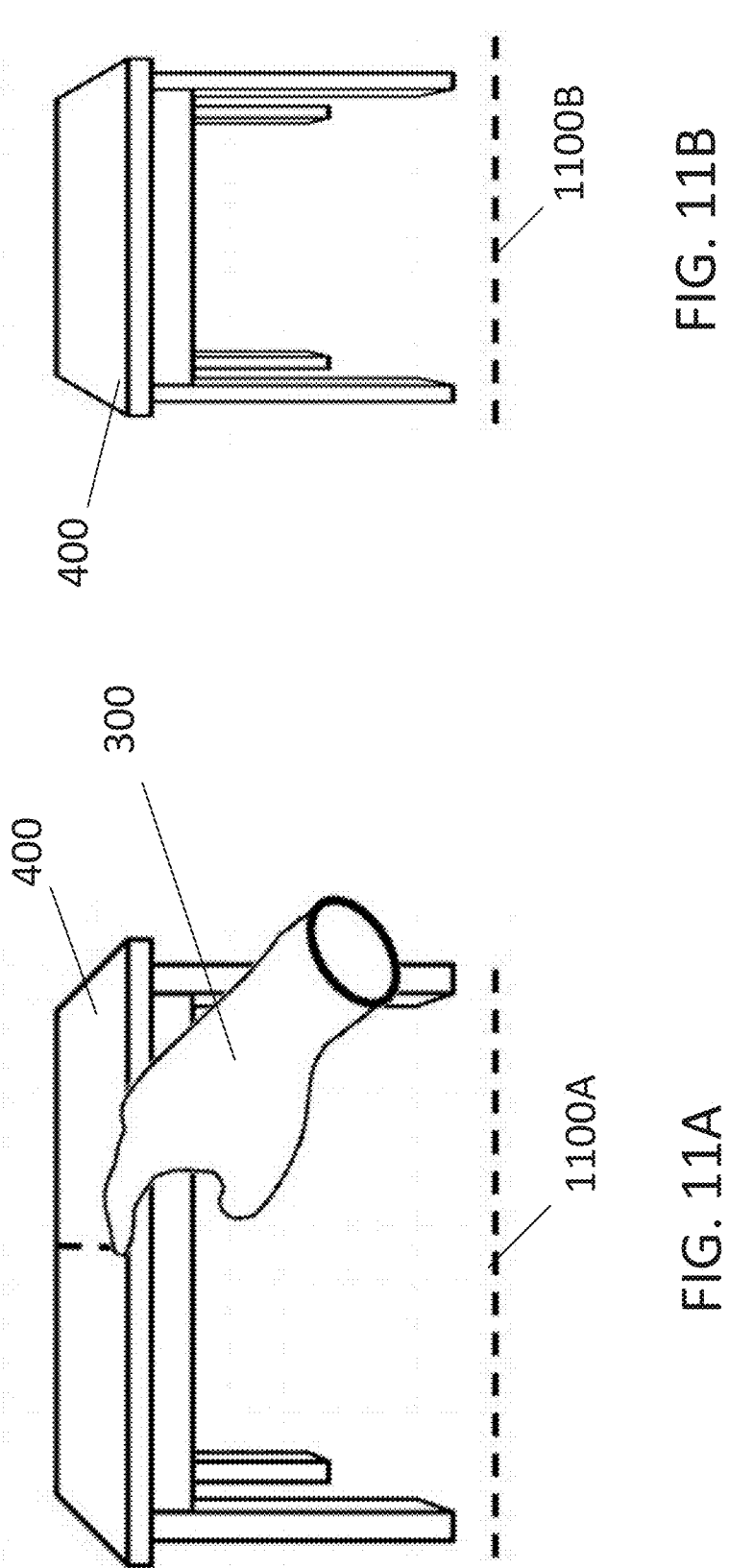
FIG. 11A is a schematic diagram of a table of a first length being selected for re-sizing to a different length by a virtual pointing hand in combination with specifying a new length of the table in an XR environment in an embodiment of the invention.
FIG. 11B is a schematic diagram of a re-sized table that is displayed in the XR environment based on selection and re-sizing of the initial table generated in FIG. 11A in an embodiment of the invention.

As an example, referring to FIGS. 11A and 11B, a user 200 in a XR environment generates a table 400 (through speech and point or just speech), the user wants to resize the object 400 after it is initially generated. The user points, for example with virtual hand 300, at the halfway point of the table and says 'I want the table to be half as long' (the user could also just say 'I want the table to be half as long'), and because the system can retrieve the size properties data of the object, it resizes the object in half (from length 1100A of 4 feet to length 1100 of 2 feet). This "re-sizing" can be done with any object, any dimension, or scaled as a whole.

In a further embodiment, a correction such as "re-sizing" of an object generated in the XR environment by gesturing size with hands or fingers and saying "no only this long" while showing a distance between hands or fingers. For example, a teacher in a XR environment may have pointed and specified a string be created in her hand, but the string, e.g., 4 foot, is too long for the intended teaching purpose. The teacher can say "no, only this long" and might gesture with fingers or hands 2 foot apart. In some instances, a correction will result in changing the default size for the same object when requested in the future. In some embodiments, users can also specify a specific distance as a correction, such "no the string is only 2 feet long" and the XR system will change the appearance length of the virtual string to the specified relative length. A user 200 can also change the default length or size or shape for objects such as "change table creation default to rectangular, 3.5 feet tall and 4 foot long by 3 feet wide" so that future tables are created with the default attributes when the attributes are not otherwise specified at the time of creation.

An example of creating multiple objects more efficiently than typing and programming includes, a user saying, "I want a table 'here' (while pointing) with 10 red and 10 blue and 10 green marbles, in a tray right 'there' in the middle of the tablet (while pointing or based on the term "middle"). I want the marbles to be 'this' big (while gesturing) and then I want several opaque bags on the table over 'there' (while pointing), and the bags should each be about 'this' big (while gesturing). Students will push a button that says, "put all marbles into a bag" and that button will be 'this' big (while gesturing) and it will be 'right' here on this table (while pointing). Once a student does that, I want my avatar to appear right over 'here' (while pointing) and tell them to pick one marble out of their bag. Now, I want the students' avatars to not be able to walk around, but instead, have 4 teams of 2, with them spawning their avatar over 'there' (while gesturing). I want Sammy 'here' (while pointing) and David 'there' (while pointing) since they are easily distracted when near each other. And I want my avatar over 'here' (while pointing), in general. Once a student takes out one marble, I want them to write down the color they chose on a pad of paper that each pair of students get, 'here' (pointing location 1), 'here' (pointing location 2), and 'here' (pointing location 3 on the table). Once the students are all done writing it down, I want that one marble that each pair has, wherever it is, to float through the air and into a clear jar right 'here' while pointing. And then we do it all over again."

In some embodiments, augmented reality environments of XR platforms can benefit from systems and methods described herein. A restaurant, for example, might want to conduct training. Each store has a little different layout. So, using methods described herein the store manager would put on a headset and be the teacher-creator and create whatever simulations they want. So, the manager user can say, "okay, I want 'THIS' knob (while pointing) on the fryer right here to pulsate in red color so the trainee knows to press it. And then once they press it, I want fake oil to start bubbling right in 'there' (while pointing), but then I want some oil to spill over and create a puddle on the ground that is 'this big' (while gesturing) right 'here' (while pointing). And then I want the system to check where the trainee goes to look for a mop, and if they go 'that way' (while pointing), I want it to flash a big message in front of them that says, 'No, this is the wrong way, there is a mop over there' and have an arrow pointing to where the other mop is."

It will be appreciated that almost any industry would be able to create their own training simulations using virtual object creation described herein in augmented reality with the actual location of the workplace, such as a restaurant. In other embodiments training simulations could be created in other XR environment such as virtual and mixed realities.

It will be appreciated that in augmented realties, there is much more necessity of user pointing, since the environment is not specifically created in virtual reality on a computer platform and is viewable objects existing in the real world. An XR platform does not have objects saved in the computer to identify the same but instead is identifying locations and coordinates relative to video imagery so that objects can be added or detected into the imagery of the augmented reality.

Another example is in a classroom for high school students using augmented reality. That is, the teacher could create all kinds of things around the classroom for students to use and do, that is, lessons the kids could do using all kinds of cool simulations, right inside their very own classroom (if they are wearing a XR headset and moving around the classroom).

In other embodiments, a teacher sometimes wants to put something in that is NOT generated from an artificial intelligence process. So, sometimes users have the AI-generated digital objects, but sometimes users do NOT. Instead, a user can use pre-approved things like the molecules that an educational application in an XR platform already has. That is, the teacher-creator may NOT want some random water molecule from AI generation but instead, wants the size and shape and color and spinning speed of a molecule that is already built-into a VR application. The teacher would say, "give me an 'EXISTING' molecule here" or some other 'wake word' of sorts to tell the system *not* to use AI to build it but instead to use existing objects, simulations, etc. that are in the application already. The reason for this is pedagogy. That is, there are many ways to show a molecule or a balance sheet, etc., and so users get some pedagogy from the application by NOT using AI but instead using pre-approved/pre-built stuff.

In further educational embodiments and simulations in an XR environment, the pointing and voice command creation of objects could be used to create highly realistic and customized environments. For example, a lawyer preparing to argue in front of the U.S. Supreme Court could use systems and methods of the invention to say, "I want the room to be U.S. Supreme Court Courtroom," "Place Justice "X" 'here' (while pointing), "Justice "Y" 'here' (while pointing), Justice "Z" 'here' (while pointing), another lawyer 'over there', and so on. The AI processes in conjunction with saved digital representations of the U.S. Supreme Court and its justices and of lawyers/people, would then place the digital representations for the user to practice arguments or more closely experience a realistic practice session for the upcoming activity with objects and persons in familiar places within the XR environment. It will be appreciated that such example encompasses countless other industries, educational environments and persons and objects that can be represented by AI in the XR environment.

In some embodiments, a conventional XR device is not necessary to implement pointing and voice command creation of digital objects in computing platforms.

Referring to FIGS. 14A and 14B and 15A and 15B, for example, two components that might alternatively be provided for the functionalities described herein include:

1. The user needs to see where they are pointing. And so, referring to FIGS. 14A and 14B, the user needs a display such as on a tablet, smartphone, or other display device 1400, that the user can look at. In such embodiment one hand holds a tablet and you can go around and point at things or locations, including creating an open-pointing digital object 1420, that a camera 1410 of the tablet 1400 detects and tracks the other hand 300 and/or finger relative to the XR environment, including an augmented reality environment where a user may point at real world locations with virtual objects being represented in the combined augmented reality. For example, a teacher in a classroom wants to enhance the classroom by adding digital 3D water molecules (open-pointing digital object 1420) in a section of the class for students to look at using their devices in AR. The teacher can use their device 1400 to point their hand/finger 300 in the view of the device's camera 1410 and say 'I want a water molecule here' and using hand tacking through the device's camera 1410 the XR system creates an object in the XR space which then students can then view through the cameras/screens on their personal devices, i.e. the students can be viewing the XR environment, such as an augmented reality, on their smartphone, tablet, or similar personal display device that receives the created virtual object from the teacher and is viewable on their display that is not necessarily an XR headset display. In one embodiment, the personal display device could be supported with a wearable device support at the user's eyes such as by cardboard and plastic glasses that receive and hold a smartphone (and the like) that are known to allow users to view XR environments with smartphones positioned at a user's eyes.

2. An input system for a user's hand, either by hand tracking or using a controller or holding a smart mouse or similar device in a user's hand that tracks direction in 3D (three dimensions) (e.g. a smart pen, smart glove, or a mouse or similar 3D input device). As shown as an example in FIG. 15, a user can use directional gloves 1500 as input device for determining location of objects. If a user is wearing the glove 1500, and has the glove 1500 connected as an input device to another connected display device 1510 (computer, iPad, tablet, phone, XR headset) the glove can input the direction in which it is pointing to the device it is connected to. If a user is pointing due north of their body, the glove communicates the geospatial location as well as the direction the glove 1500 is pointing. Without being in view of the camera onboard the connected display device 1510, the user can say 'I want a water molecule on that table' and the glove communicates 1) its location and 2) where the user is pointing, and the device the glove is connected to can generate that object in XR. Camera on device 1510 does not need to "see" glove 1500, as all required location and directional input is communicated by the glove 1500.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for generating a digital object in an extended reality environment comprising:

detecting a voice command from a user using an extended reality environment via an extended reality hardware device, wherein the voice command requests creation of a digital object for display in the extended reality environment, and wherein the voice command includes an adverb of place indicating a location for creation of the digital object;

detecting a pointing action from a hand of the user to a location point in the extended reality environment via the extended reality hardware device;

retrieving a representation of the digital object for creating the digital object at the location point; and creating the representation of the digital object at the location point in the extended reality environment via the extended reality hardware device in response to both the detecting of the voice command and the pointing action from the user.

2. The method of claim 1, wherein the extended reality environment is an augmented reality environment.

3. The method of claim 2, wherein the location point from the pointing action of the user intersects a wall or floor of the extended reality environment.

4. The method of claim 2, wherein the location point from the pointing action of the user intersects an extended reality boundary of an existing extended reality object and the digital object is displayed on or interacting with the existing extended reality object.

5. The method of claim 1, wherein the extended reality environment is a virtual reality environment.

6. The method of claim 5, further comprising retrieving multiple different representations of the digital object and receiving selection of the representation of the digital object to display at the location point from the user.

7. The method of claim 5, wherein the location point is a vector with coordinates in the virtual reality environment.

8. The method of claim 1, further comprising retrieving multiple different representations of the digital object and receiving selection of the representation of the digital object to display at the location point from the user.

9. The method of claim 8, further comprising:

receiving spoken instructions from the user via the extended reality hardware device that the digital object should include one or more visual attributes; and modifying the representation of the digital object via the extended reality hardware device in the extended reality environment as including the one or more visual attributes.

10. The method of claim 9, wherein the one or more visual attributes are selected from a group including: type, color, size, volume, height, width, length, movement, speed, texture, location of components of the digital object and combinations thereof.

11. The method of claim 1, wherein the location point is a vector with coordinates in the extended reality environment.

12. The method of claim 11, wherein the location point from the pointing action of the user intersects an extended reality boundary of an existing extended reality object and the digital object is displayed on or interacting with the existing extended reality object.

13. The method of claim 11, wherein the location point from the pointing action of the user intersects a wall or floor of the extended reality environment.

14. The method of claim 1, further comprising:

receiving spoken instructions from the user via the extended reality hardware device that the digital object should include one or more visual attributes; and modifying the representation of the digital object via the extended reality hardware device in the extended reality environment as including the one or more visual attributes.

15. The method of claim 14, wherein the one or more visual attributes are selected from the group including: type, color, size, height, volume, width, length, movement, speed, texture, location of components of the digital object and combinations thereof.

16. The method of claim 14, wherein the location point is a vector with coordinates in the extended reality environment.

17. The method of claim 1, further comprising:

receiving a size gesture detected from one or more hands of the user via the extended reality hardware device that the digital object should be represented according to the size gesture; and displaying the representation of the digital object via the extended reality hardware device in the extended reality environment as including a size in accordance with the size gesture.

18. The method of claim 17, wherein the size gesture is received from detection of both hands of the user via the extended reality hardware device.

* * * * *